United States Patent
Schindler et al.

(10) Patent No.: US 8,351,395 B2
(45) Date of Patent: Jan. 8, 2013

(54) WLAN ROAMING AND SELECTION USING MANAGED WLAN HANDOVER PROCESS

(75) Inventors: Sigram Schindler, Berlin (DE); Juergen Schulze, Berlin (DE); Doerte Schoenberg, Berlin (DE); Marius Witke, Berlin (DE); Ivo Gadow, Berlin (DE)

(73) Assignee: Sigram Schindler Beteiligungsgesellschaft mbH, Berlin (DE)

( * ) Notice: Subject to any disclaimer, the term of this patent is extended or adjusted under 35 U.S.C. 154(b) by 0 days.

(21) Appl. No.: 13/177,346

(22) Filed: Jul. 6, 2011

(65) Prior Publication Data

US 2011/0286431 A1 Nov. 24, 2011

Related U.S. Application Data

(62) Division of application No. 11/969,388, filed on Jan. 4, 2008, now Pat. No. 8,014,364.

(60) Provisional application No. 60/889,341, filed on Feb. 12, 2007, provisional application No. 60/895,238, filed on Mar. 16, 2007, provisional application No. 60/910,384, filed on Apr. 5, 2007, provisional application No. 61/014,157, filed on Dec. 17, 2007.

(30) Foreign Application Priority Data

| Feb. 12, 2007 | (DE) | 10 2007 007 701 |
| Mar. 16, 2007 | (DE) | 10 2007 013 542 |
| Mar. 19, 2007 | (DE) | 10 2007 013 550 |
| Mar. 23, 2007 | (DE) | 10 2007 014 937 |
| Apr. 5, 2007 | (DE) | 10 2007 017 391 |
| Apr. 25, 2007 | (DE) | 10 2007 020 548 |
| May 2, 2007 | (DE) | 10 2007 020 986 |
| May 18, 2007 | (DE) | 10 2007 023 620 |
| Nov. 15, 2007 | (DE) | 10 2007 055 021 |
| Dec. 10, 2007 | (DE) | 10 2007 059 757 |
| Dec. 17, 2007 | (DE) | 10 2007 061 336 |
| Dec. 21, 2007 | (DE) | 10 2007 063 448 |
| Dec. 28, 2007 | (DE) | 10 2007 063 506 |

(51) Int. Cl.
*H04W 4/00* (2009.01)

(52) U.S. Cl. ..................... 370/331
(58) Field of Classification Search .................. None
See application file for complete search history.

(56) References Cited

U.S. PATENT DOCUMENTS

| 6,169,894 | B1 * | 1/2001 | McCormick et al. | 455/414.1 |
| 6,519,455 | B1 * | 2/2003 | McCormick et al. | 455/438 |
| 7,602,723 | B2 * | 10/2009 | Mandato et al. | 370/236 |

(Continued)

FOREIGN PATENT DOCUMENTS

| JP | 2005-86750 A | 3/2005 |
| JP | 2005-311702 A | 11/2005 |

OTHER PUBLICATIONS

Mouly M, et al.,"The GSM System for Mobile Communications: 1. Setting the Scene", Jan. 1, 1993, GSM System for Mobile Communications, Lassay-Les-Chateaux, Europe Media, FR, pp. 22-76, XP-000860001.

(Continued)

*Primary Examiner* — Raj Jain
(74) *Attorney, Agent, or Firm* — Novak Druce DeLuca + Quigg LLP

(57) ABSTRACT

A method for providing information to a first terminal system and/or a second terminal system which connected to each other through a network and are subject to a potential or actual handover, provides convenience information about the execution of the potential or actual handover to at least one of the first and the second terminal systems, prior to or with the start of the handover, and provides in addition to at least one of the first and the second terminal systems a commercial communication relating to a commercial measure, whereby the commercial communication is provided in correlation with the provision of the convenience information.

40 Claims, 13 Drawing Sheets

U.S. PATENT DOCUMENTS

| | | | |
|---|---|---|---|
| 2005/0083885 A1* | 4/2005 | Ikeda et al. | 370/331 |
| 2006/0227746 A1* | 10/2006 | Kim et al. | 370/331 |
| 2007/0165572 A1* | 7/2007 | Lenzarini | 370/331 |
| 2008/0130581 A1* | 6/2008 | Hwang et al. | 370/331 |

OTHER PUBLICATIONS

Mouly M, et al.,"The GSM System for Mobile Communications: 6. Radio Resource Management", Jan. 1, 1993, GSM System for Molbile Communications, Lassay-Les-Chateaux, Europe Media, FR, pp. 308-430, XP-000860006.

European Search Report issued on Aug. 4, 2011 in corresponding EP application.

Japanese Notification of Reasons for Rejection mailed on Nov. 1, 2011 in corresponding Japanese application.

* cited by examiner

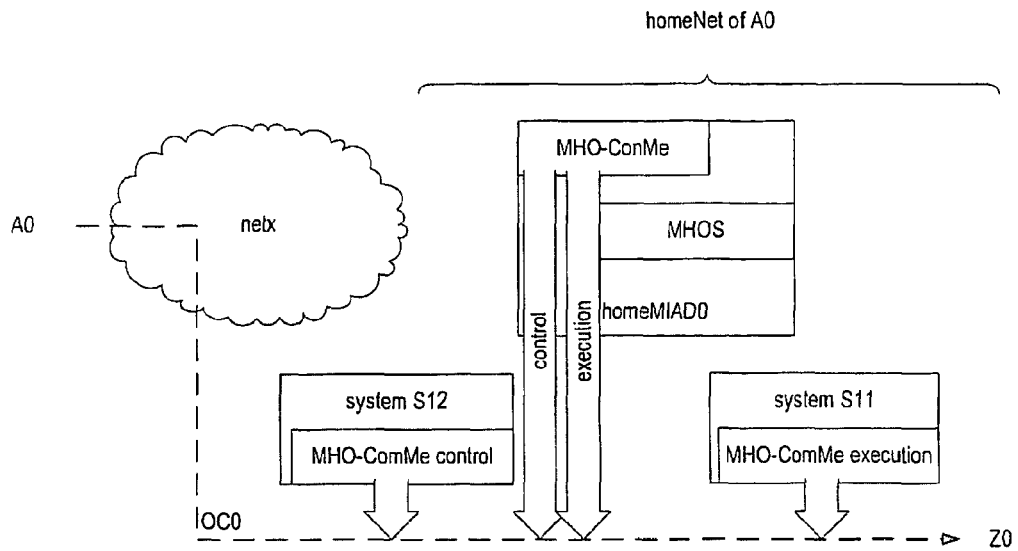
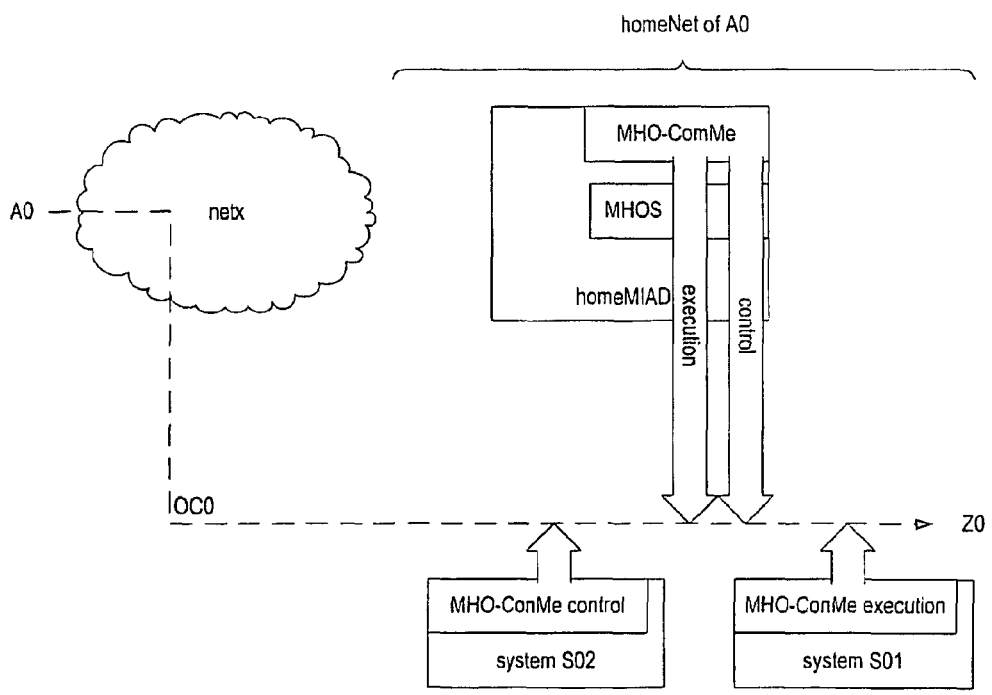
Figure 7b
Figure 7c

WLAN ROAMING AND SELECTION USING MANAGED WLAN HANDOVER PROCESS

BACKGROUND OF THE INVENTION

The present invention relates to a "netsurfing" method for a terminal system A0—with a real or virtual home network Integrated Access Device (A0-homeIAD0) and an A0-connection to a second terminal system Z0—with a "managed handover" (MHO) to a real IADx in a Wireless Local Area Network (WLANx) or to a virtual IADx for a mobile network (netx). The MHO is supported by the A0-homeIAD0.

An A0-connection is often relayed over an MHO-module MHOM which is controlled by the MHO-specification MHOS in the A0-homeIAD0. This offers benefits to both operators of sharedIADx/A0-homeIAD0 and to users of their homeTerminalSystems.

An MHOM (including/or excluding MHOS) differs essentially from a "Home Agent" of the internet mobility technology and can therefore also support present-day WiFi/FMC (fixed-mobile convergence) telephones. I.e: The netsurfing method is in the short term geared to the VoIP telephony—but is not restricted thereto.

Background of Existing HO Technology

The state of the art in the case of the "seamless HO" is stated appropriately in the US 2006/0099948A1 in its BACKGROUND section and the description of its method, especially in the case of "media independent handover" (MIH). The different technical HO versions are discussed—in even wider details—in the "IEEE802.21 Overview Publication" by V. Gupta et al. (DCN 21-06-0706-00-0000), as well as the UCLA CSD-TR No. 040012 by L.-J. Chen, as well as the work by G. A. Mills-Tetty et al. ("Mobile Voice over IP (MVOIP) . . . ", Proc. of the 21. IEEE International Performance, Computing, and Communications Conference, 2002), as well as E. Edvardsen et al. ("Open Access Networks", Telenor Research and Development, 2002) or H. Almus ("Open Broadband Access Networks", TERENA Networking Conference 2006) or P. A. Frangoudis ("Experimental evaluation of community-based WLAN voice and data services", ICST 978-963-06-2670-5). The extensive equipment of internet mobility technology for a future generation HO technology is discussed in the pertinent and complete overview of the book by J. Schiller ("Mobile Communications", Addison-Wesley, 2003).

These works describe the state of the HO technology art meticulously and thus show that it does not embody the innovative features of the netsurfing method, i.e. its features to be suitable
  for the MHO-support of present-day WiFi or FMC telephones and shared WLAN-IADs, by dispensing with nowadays not (yet) WiFi-/FMC-telephone-conventional technology and in particular
  for bringing about benefits for homeIAD-/shared IAD-operators and terminal system users, whilst shielding such benefit usages from any further network operator.

The netsurfing method has respectively at least one additional technical feature compared with the internet mobility technology and the "HOCIS method" (PCT/EP 2007/010485 of Mar. 12, 2007, whose contents are incorporated by reference into the present application, so-called "Incorporation by Reference"): This additional feature is its possibly tunnel-free relaying (i.e. the above first feature) and its technical communication respectively for implementing a commercial measure of a homeIAD-/shared IAD-operator—which as a rule takes place to both terminal system users in a VoIP call, as a rule by means of different messages to both, namely deliberately on the occasion of the HO of one of them and then convenience-information-correlated (i.e. the above second feature). The two technical features—the tunnel-free relaying and an additional technically "convenience-information"-correlated (commercial) communication—are implemented by neither the state of the HO art nor by the state of the internet mobility art (the latter with its WO 2006/031379 A1 and WO 2006/031384 A1 which go in a similar direction and which clearly rule out however inter alia a telephony/VoIP use) nor by the HOCIS method nor one of the "sponsored call" methods (see for example "Rich Multimedia Applications on IMS Framework", August 2007, or "ARGELA Multimedia Sponsored Call White Paper", on the respective websites).

SUMMARY OF THE INVENTION

The present invention provides a "netsurfing" method for a terminal system A0—with a real or virtual A0-homeIAD0 and an A0-connection to a second terminal system Z0—for its "managed handover" MHO to a real IADx in a WLANx or to a virtual IADx for a mobile netx (IAD=integrated access device). The MHO is supported by the A0-homeIAD0.

An A0-connection is often relayed over an MHO-module MHOM which is controlled according to an MHO specification MHOS in the A0-homeIAD0 (both implementations distributed or local), which offers benefits to shared IADx/A0-homeIAD0-operators and users of their homeTerminalSystems. The MHOS is A0-homeIAD0-operator-private and where applicable homeTerminalSystem-individual. This relay control offers benefits:
  to a shared IADx-operator in respect of a netsurfer in A0:
    The latter is no longer a legal risk for him since for A0 the homeIAD0 is identifiable and thus its operator is legally responsible for an internet abuse by A0.
  to a homeIAD0 operator and all shared IADx-operators cooperating with him, e.g.
    MHO-versions of the netsurfing of the IAD0-/shared IADx-homeTerminalSystems and accompanying this considerable cost reduction/quality improvement-potential of the operation thereof,
    Commercial possibilities for homeIAD0-/shared WLANx operators through "CI-correlation" of their messages with "HOCIS"-infos creating receptiveness and sympathy and where necessary sending this not only to the netsurfer but also to his dialog partner—namely each time technically and contents-wise according to needs, i.e. differently, designed,
    Security of the use of such benefits (i.e. their use is independent of third parties, where necessary even invisible for them, e.g. intermediary network operators)—which however does not rule out a support of the Wsurfing method through other parties, e.g. a network operator.
  to the terminal system users because they—for the reasons just mentioned—find more open shared-WLANs and their MHOs inter alia to these shared WLANs are more comfortable for them than previously, particularly on account of their "CI-correlation".

The functionality of an MHOM (including or excluding MHOS) is restricted/expanded on the L3-L7 of the OSI RM compared to that of the "home agent" of the internet mobility technology in order to be able to practice this HO-management also with present-day WiFi/FMC telephones and shared WLANs, which have no command of suitable tunnelling, and/or to be able to utilise the benefits mentioned above. I.e.: The netsurfing method is aimed in the short term at the VoIP telephony and even more specifically at the "WLAN surfing" alias "Wsurfing" in VoIP calls, which shapes the examples of this section B., at its security/privacy (see Section C.) and at its commercial use—but is not restricted to anything of this kind.

In order to underline this, reference is made to the possibility of using the Wsurfing method for example in the context of the IP-TV transmission—instead of VoIP transmission or accompanying it—, or possibly in the context of a security-orientated real-time accompaniment of the user of A0. In all such communications applications all the following comments on Wsurfing/netsurfing are as equally relevant as in the case of the VoIP communications application. The latter can therefore be regarded as representative of these many other possibilities for applying the method/apparatus according to the invention, for which reminders will be made in the following only occasionally.

A small homeIAD can enable at least one terminal system (e.g. a telephone and its user) access to at least one network and support in the above mentioned sense, e.g. to the internet and/or PSTN, through an access to itself, wherein the latter takes place either by wireless network and therein any definable region (e.g. the reception range of an IAD or any, possibly the entire, region of a GSM network),
or by physical connection (e.g. telephone or coax cable).

The realisation of a WLAN in the sense of this specification can be based on the basis of e.g. "RFI" or "Bluetooth" or "Femtocell" or "DECT" or "Wimax" or "GSM/CDMA/UMTS/GPRS/HSPDA/ . . . "technology, more particularly "WiFi" technology, where necessary comprise heterogeneous IADs (earlier erroneously called APs, AP=access point) and/or BSs of a mobile network (BS=base station) and extends to a region defined anyhow of the reception range of an IAD or a BS. A large homeIAD/homeServer can enable thousands of terminal systems network accesses and support them in the aforementioned sense, thus for example can be an internet server or a system at/in one of these networks.

An MHOM consists of abstract (=functional) HW/SW components. It does not need to use its abstract HW components exclusively for its MHOM-alias netsurfing-functionality, but is suitable for sharing its abstract use with at least one functional non-MHOM (="abstract resource sharing" between these modules, see Section C.). An MHOM can thereby be located in any "material" host system—e.g. can be hosted by any material IAD or material system in or on a network—without it needing for this a material HW expansion (see end of Section C.). Also the SW components of an MHOM (in its host system) can exist coded in any way anywhere—but in such a way that before drawing on a function of one of these SW components their parts which are responsible for this function can be compiled into semantically equivalent code and loaded into the host system, and thus can be executed by means of the aforementioned MHOM-HW components. This conception of an MHOM is too narrow for the following discussion and is subdivided further in section C., but is sufficient for the moment. The relevant person skilled in the art is acquainted with these terms/conception.

The netsurfing method is a communications application (according to the MHOS) which as a rule is positioned on the L7 of the OSI connection/connection OC0 (see below) between A0 and Z0. Irrespectively of whether this MHOM functionality is implemented partially or totally in a WLAN0 (then for example in the IAD0 controlling it) or outside (then for example in an internet server or a network system, and thus outside of the IAD0 controlling it), it can be supported by functions in the terminal systems A0 and/or Z0—which as a rule improves the convenience of netsurfing, but which can also be omitted.

The legal security mentioned above of the shared WLAN form of usage of the netsurfing (e.g. of a mobile telephone A0 in its calling Z0) comes about in that its drawing on according to the invention for example a shared IAD therein is restricted to its use exclusively as a router exclusively to an MHOM with fixed IP address, thus to a known operator. This MHOM operator can identify without any doubt a responsible party of an OC0 relayed over it (if it undertakes this relaying at all, and then for example at the start of the call or earlier—how is irrelevant here, but the relevant person skilled in the art is acquainted with suitable methods for this). This MHOM operator is thus responsible for discovering the identity of a user of a wireless telephone at a shared IAD—not the operator of the latter. It should be noted: Deviating from this the MHOM ought to enable the access routed to it to the internet for A0 (and thus for its VoIP call to Z0), if this concerns an emergency call (whereas this is however at the present day legally completely open).

Versions given by way of example of implementing this legal aspect of the netsurfing form of usage by shared IADs are outlined at the end of this section B. First however the user's view alone of the HO-technical core of the Wsurfing method is shown by way of concrete examples in which the MHOM0 is integrated into a homeIAD0/homeServer0 of a terminal system A0. Versions of the separation of the functionalities thereby used are discussed in FIGS. 6-8 and their explanations in section D. Section C. explains the commercial core of the netsurfing method and it's "CI-correlation".

BRIEF DESCRIPTION OF THE DRAWINGS

FIGS. 7a-7e show additional examples of telecommunications arrangements to which the method according to the invention can be applied;

DETAILED DESCRIPTION OF THE INVENTION

Figure 1:
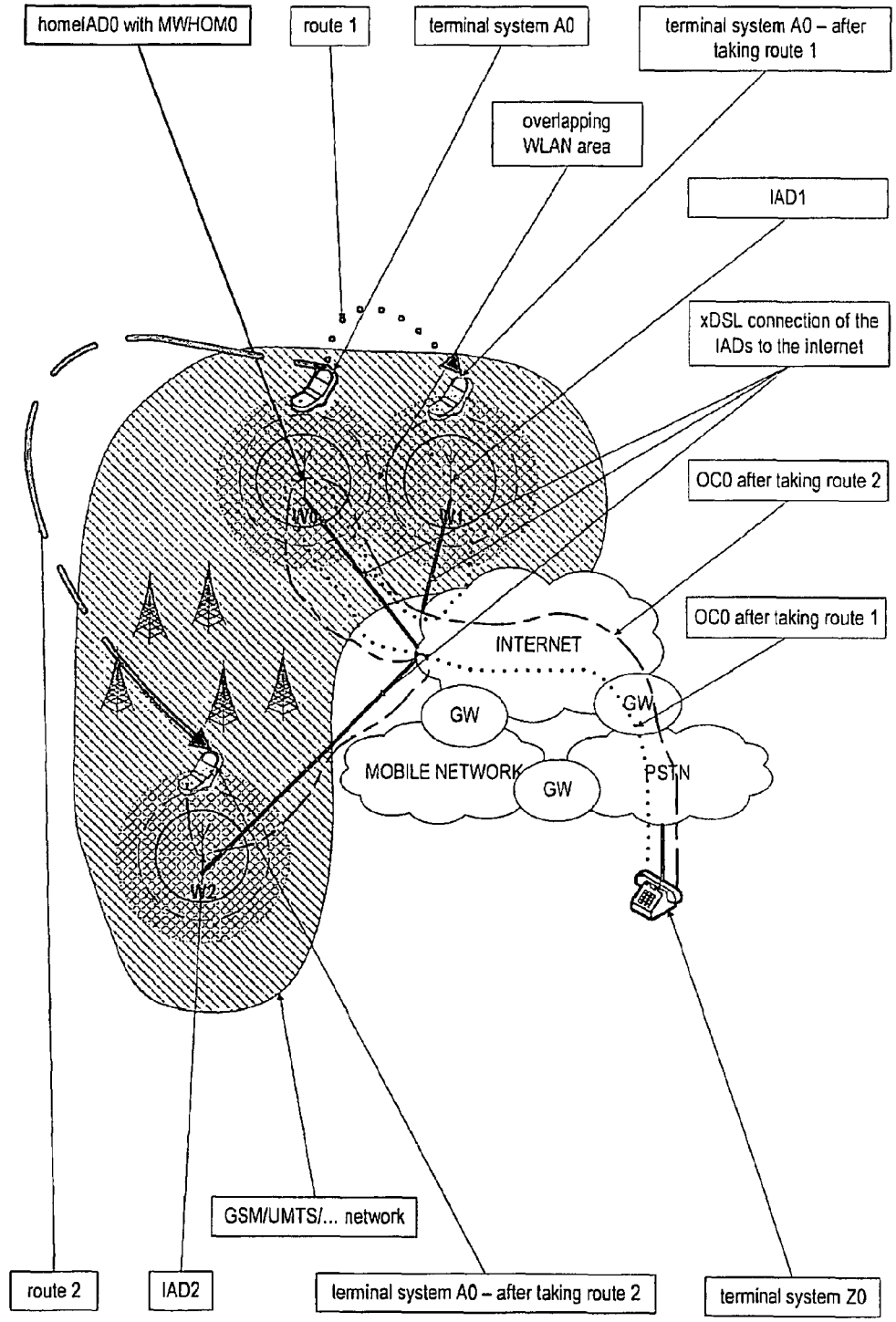
FIG. 1 shows an example of a mobile terminal A0 moving between different WLAN regions in accordance with one aspect of the invention.

The simplest Wsurfing alias netsurfing situations are shown in FIG. 1: a direct or indirect MHO of the mobile terminal system A0 of a TCP (=technical communications process, see section C.)—e.g. an FMC-telephone and its user—from its homeWLAN0, in short: W0, synonymously homeIAD0, into the W1 and W2 not disjoint and disjoint respectively with it on the route 1 and 2 respectively. The L7-connection of an OC0 which may exist between A0 and Z0 remains unaffected by these MHOs on routes 1 and 2 respectively. At least one L3-connection in the A0-OC0 is however—when the terminal system A0 is located in W1 or W2—relayed by the corresponding IAD1/IAD2 according to the invention over the MHOM0 in the homeIAD0 of the W0. Details about this are known from the internet mobility technology (see Section A.).

It should be noted that here there is no restriction as to in what way the respective L3-connection (segment) is established between the mobile terminal system A0 in W1 or W2 and the homeIAD0/homeServer0 of W0 during an MHO: This patent application thus comprises all quite different possible versions of this establishment of an L3-connection between the L3-entity in A0 and that in the MHOM0. If A0 is by way of example a telephone, then this L3-connection can come about in particular through its calling the MHOM0, or vice versa—or it can exist straightaway (technical details which favour this are irrelevant here). This also applies to the case of a "complete new beginning" of a telephone call of a present-day WiFi-/FMC telephone A0 from a WLANx to Z0, for whose implementation the MHOM0 has to be suitably designed on the L7 (in the IAD0).

After this discussion of a "direct MHO"—i.e. from one WLAN directly to another WLAN—it is obvious how an "indirect MHO" functions according to the invention in which therefore the two WLANs, between which the terminal system A0 alternates, do not overlap one another in terms of space or time (see the WLANs W0 and W2 as well as route 2 in FIG. 1).

Here it is necessary to differentiate between two cases:

In the "no-WLAN" range during a certain period of time or section of the route no other network can be used by A0 also—for technical or administrative reasons. In this case in the A0-OC0 to Z0 in this range no information transfer can take place since it does not have a continuous L3-connection between A0 and Z0. The L4-L7 connections in the A0-OC0 are however independent of this and can remain existing where necessary so that the current communication between A0 and Z0 by means of the A0-OC0—thus that of the suspended TCP—furthermore exists and can be continued as soon as A0 enters a WLANx by means of whose IADx a "Wsurfing connection" for the A0-OC0 can be established between A0 and the homeIAD0/homeServer0 (and its MHOM0).

In this "no-WLAN" range another network can be used by A0, so to speak a Wsurfing substitute network, possibly a mobile network on GSM/CDMA/GPRS/HSPDA/... basis or a fixed network. If we remain with the first example and assume that A0 would be an FMC telephone and had access (see below) to this mobile network, then a Wsurfing connection for A0 can be established between A0 and homeIAD0/homeServer0 (by means of its MHOM0) over this mobile network—exactly how in detail can again be disregarded here. With the subsequent entrance and check-in of A0 in W2 this mobile-network-based Wsurfing connection for A0 is then replaced by an internet-based Wsurfing connection for A0—where necessary after a security check in the MHOM0 according to the invention.

Figure 2:
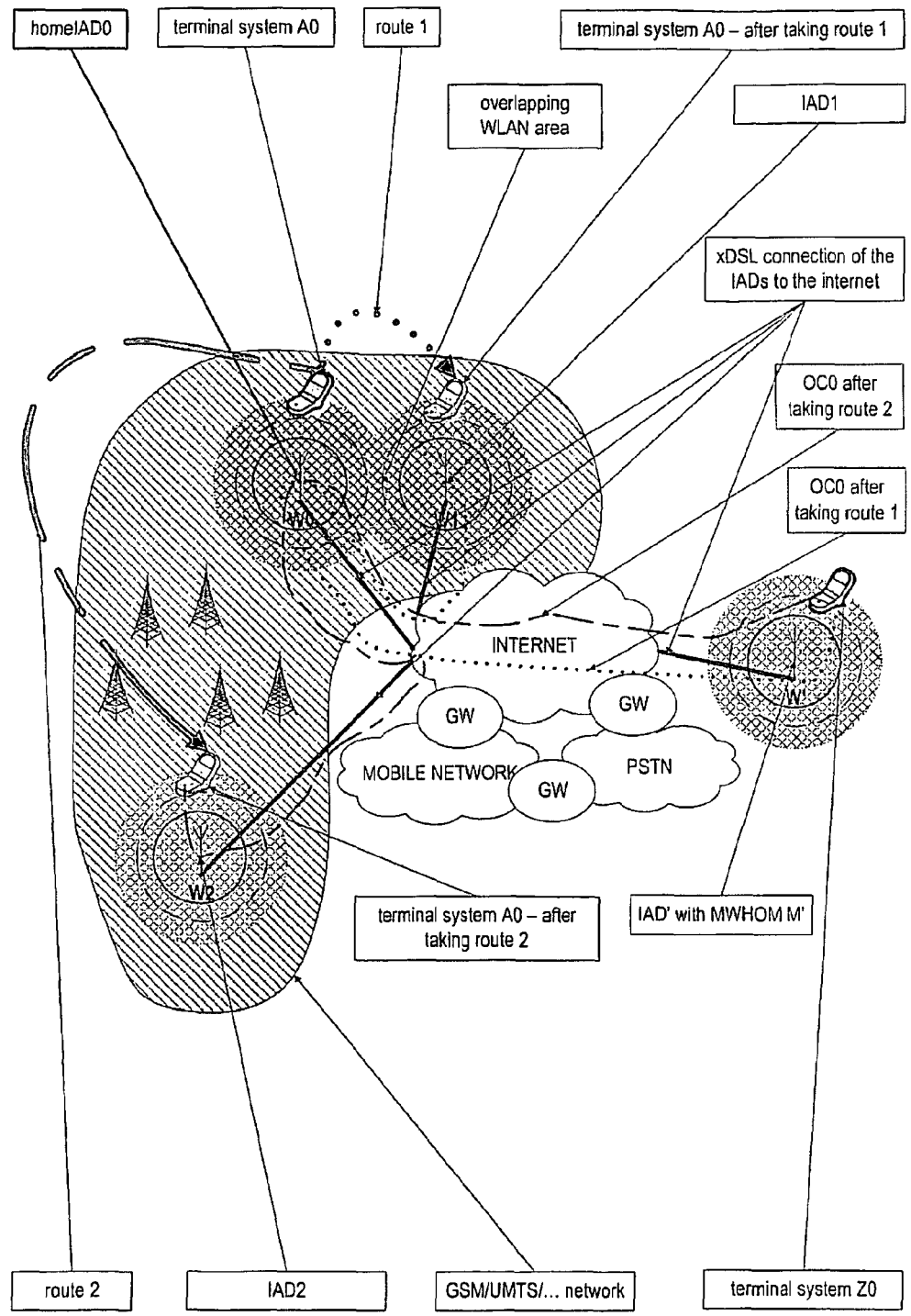
FIG. 2 shows an example of a mobile terminal A0 moving between different WLAN regions in accordance with another aspect of the invention.

After these detailed discussions on the "calling terminal system"-MHO of A0,—thus of the "caller-supported netsurfing", as shown in FIG. 1—it is obvious that there is also a "called terminal system"-MHO, i.e. the "called-supported netsurfing of A0" (see FIG. 2). For the latter netsurfing version the same applies as was mentioned in the preceding paragraph, whereby here the MHOM M' can be located in an IAD' between the internet and the terminal system Z0. The M' enables WLAN change by A0 and the Wsurfing connection between A0 and M' by means of precisely the same MHO functionality as M, i.e. M' is likewise an MHOM—however under some circumstances by reducing the internet abuse protection outlined above.

Figure 3:
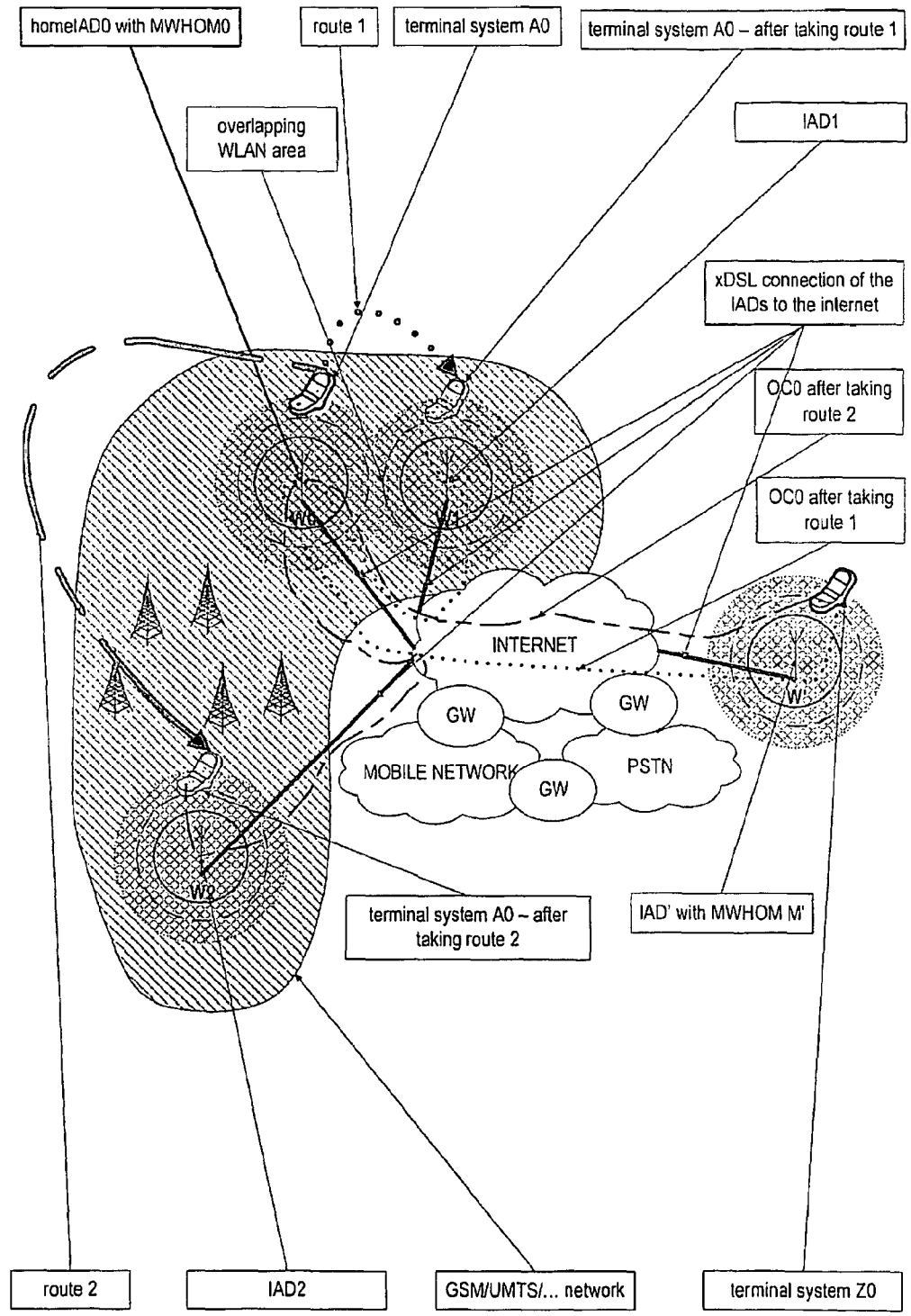
FIG. 3 shows an example of a mobile terminal A0 moving between different WLAN regions in accordance with yet another aspect of the invention.

Finally it can be seen that the OC0 between A0 and Z0 can naturally also be supported in both terminal systems each by one MHOM, thus MHOM0 and M', (see FIG. 3). In this case these two MHOMs when necessary can where possible autonomously carry out a "rerouting" of the L3-connection of the OC0 between them—in order to thereby for example lower the costs of their TCP or improve it in some other way.

We come back to the above assertion that the netsurfing method with caller-supported netsurfing would make the misappropriate use of the internet considerably more difficult and more generally to some communications (security) technical aspects of the method according to the invention.

This assertion regarding the obstacles to internet abuse is relevant because any such abuse can seriously affect the more easily identifiable (because for example longer term stationary) operator of the MHOM MO so that this operator will protect himself against such abuses in that he will grant access to his MOHM only to persons sufficiently well known to him. In addition to this an implementation version could be used in which for example only MOHM MO can initiate a Wsurfing connection from A0—after it was informed in some other way about its suitability, possibly via an "A0 tracking system" or actively from A0 by GPRS or SMS or ...—so that a shared IAD1 has not even the possibility of successfully starting to establish a Wsurfing connection because already any such attempt by the MHOM M0 would be replied negatively in the homeIAD0, or a mobile terminal device unknown at the IAD1, here e.g. A0, if it wants to use the IAD1 for Wsurfing, does not define its individual MHOM0 (e.g. through an initial short "blind call" to this), but that IAD1 forwards all such requests by persons unknown to it stereotypically to an identity check server entrusted to it and only this establishes the L3-connection to the MHOM0 where necessary over itself—wherein this identity check server is made available to the IAD1 possibly by a credit card institution or an ISP or a chain store or ... for sharing.

The netsurfing method thus allows the implementation of quite different methods which relieve a shared IAD operator of all legal risks during "VoIP surfing" or "IP-TV surfing", as the technology according to the invention could also be called. Appropriate dependant security-orientated method claims concretise this by way of example. It is apparent from this that the protection range of the Wsurfing method permits special forms of execution thereof which eliminate these known WLAN-sharing risks practically entirely.

In this connection reference is made in conclusion to the communications status CS: This can change so to speak "independently" for example time/place/remote controlled—and thus also the admissibility/non-admissibility/feasibility of a netsurfing connection between A0 and its homeIAD0, even if A0 does not even change its location. More on this is contained in Section C. at the end.

C. Definition of the Terms/Concepts and OSI RM Description of the Netsurfing Method as Well as its MHOs, ComMe-MHOs and their "CI Correlation"

The descriptions in this specification of the method/apparatus according to the invention are—like their terms and concepts—purely functional, i.e. entirely abstract, thus absolutely independent of a material implementation. For demonstration purposes however some possible material implementations of this method, this apparatus and these ideas/concepts/terms are also explained on occasion. It is thereby to be noted that the following explanations of these terms/concepts—throughout in the sense of the OSI RM—serve only to clarify (the essence of) the method/apparatus according to the invention, thus not as the fundamental clarification of other questions relating to communications technology.

A handover (HO) alias an HO-process of a terminal system and its TCP—i.e. its change-over—takes place between at least two of either communications networks or access points of a network or performance features at an access point of a network. The present invention thus considers not only "vertical" HOs, i.e. HOs between different networks, but also HOs between access points and/or performance features of the same network, so-called "horizontal" HOs, and any mixture between all the HO-types mentioned above.

Conceptually (i.e. purely functional, completely abstract)
an abstract "communications process" alias "telecommunications process, TCP" takes place between several human and/or non-human "subscribers" (SUBCs) to it who in turn are "users"—or their proxies/part functionalities/supplementary functionalities, such as e.g. call answering machines, mail boxes, MP3-players, IVR systems, typed/hand written-/graphic-/symbol-/speech-/...-/DTMF-generators/DTMF-detectors/interpreters/filters of an active and/or passive kind, in general: "communications application systems" (see below)—of "terminal systems" (see below) and belong to these, whereby these terminal systems have access to at least one network. Networks/terminal systems/users collectively accomplish the (abstract) technical implementations of the TCPs.

Thereby are called:
a communications process alias TCP
"potential", if a concrete measure was indeed carried out for it in at least one TCP terminal system involved in it, but still not in any device of its TCP terminal systems (i.e. only in at least one TCP SUBC in at least one of these TCP terminal systems, and this can be in it still "vague in some way", thus e.g. an intention for this or even only a wish or need)
"current", if this has already happened in at least one such terminal device and
"started" alias "begun" in each of the two cases,
"retrospectively" alias "ended" if no longer any concrete measure is taking place for it in any of the TCP terminal devices involved with it
i.e. it "is present" alias "exists" in all of these cases.
It should be noted that a TCP would thus at the latest be begun/started when in at least one terminal device (e.g. a telephone) of one of its terminal systems at least one measure relating to it was started/begun (e.g. the lifting of the telephone receiver, or the local input/output or even only the local selection of a telephone number of a party to be called by somebody participating in the TCP somehow, or the manual or automatic start of a timer whereupon on expiry thereof a call takes place, or . . . )
a current TCP to be
"in the connecting state" until a SUBC data exchange has started in it,
"starting to run" as soon as this SUBC data exchange has started, and
"running" as soon as the SUBC information exchange has started,
wherein an "exchange" has started as soon as the exchange of at least one "SUBC data" or one "SUBC information" of a TCP-SUBC has started between at least one TCP terminal system and at least one network currently used by the latter. A SUBC data or SUBC information is thereby a finally/originally SUBC-perceivable/possible to generate information which was displayed or entered or selected by means of this terminal system to/by this (non-human or human) SUBC.

The difference between a SUBC data and a SUBC information is that
SUBC data are as a rule only exchanged for a possibly required management (=establishing, interruption, . . . , termination) of a TCP or its OSI connection or its Li-connections, thus as a rule during an Li-connecting state and/or starting to run,
whilst SUBC information is exchanged for fulfilling the purpose of a TCP, thus during its running—i.e. no longer for its technical establishing/management, as above—,
in both cases between its (where applicable each) SUBCs or aforementioned proxies/part functionalities/ . . . .

the communications technical ideas/concepts/terms used in this patent application are defined in the internationally standardised "*ISO 7498-1, Information technology—Open Systems Interconnection—Basic Reference Model: The basic model*", in short: ISO/OSI Reference model or OSI-RM. It forms for the relevant person skilled in the art the binding theoretical/conceptual basis of this patent application.

The wordings of the netsurfing method/apparatus according to the invention in most of the claims are based—despite their "pseudo-natural-linguistic" formulation—on the conception/terminology defined in the OSI-RM, thus have already undergone the communications technological precisions/restrictions of the OSI RM which eliminate many uncertainties of their "purely natural linguistic" meanings.

The description of the netsurfing method/apparatus according to the invention uses still wider OSI-RM terms/concepts, such as e.g. OSI connections/PDUs/SDUs/Layers/Li connections/ . . . which belong to the "artificial" terminology/conceptuality of the OSI RM—thus are avoided in the pseudo-natural linguistic wordings/meanings of the claims. The description thus makes use of the ability of the relevant person skilled in the art to articulate unambiguously through OSI RM made-up words/terms (of which for example some have just been named). The relevant person skilled in the art will consider this helpful for making sure he gets the correct understanding of the pseudo natural linguistic description of the essence of the netsurfing method/apparatus in their respective main claims.

For the following use of the OSI terminology/conceptuality and especially for the OSI RM made-up words/terms in this written specification it should be pointed out in advance that the latter
on the one hand cannot recapitulate them completely so that as a substitute reference is made to the above mentioned international standard, wherein in cases of doubt this written specification is the authority, and on the other hand at some places simplifies/coarsens them up regarding the conditions in the case of an MHO (see below and Section D.).

And finally it should be emphasized that the recourse to the OSI RM terminology/conceptuality in this patent application is indispensable: The dominating "internet jargon" practiced today does not have the specific terminology desirable for legal documents by far—in order to achieve that and in any case to improve the usual muddle regarding communications technological language/meanings the OSI RM was ultimately developed. The specific meanings of the terms of this patent application thereby serve not only to fix their main claim meanings, but also to facilitate/specify the understanding of its descriptions of the method/apparatus according to the invention—and more particularly to thwart possible attempts to get round the protection range requested which would consist in wanting to reduce it by means of restrictions only because these are not shown as inadmissible in the present patent application, just by means of these descriptions.

Incidentally it is necessary not to confuse the absolutely necessity emphasised in the previous paragraph of the recourse to the OSI RM with the insight also underlying the OSI RM that a clear description of a complex system—of any origin—anyway requires its abstraction from its many (material) implementation details and its unconditioned focussing on its (thus abstracting=abstract) functionality.

Rather the OSI RM could and can mainly only on this basis—thus whilst observing the last mentioned requirement—define the elementary ideas, concepts and terms which are very helpful and even necessary for a clear description of many aspects especially of communications systems.

there is in each "n-point communications process", $n>=2$, between any two of its terminal systems, for example A0 and Z0, an abstract "OSI connection"—which also extends to communications application systems in these two terminal systems, as will be explained below. Each OSI connection is according to the OSI RM basically always subdivided into 7 abstract "Li-connections" ($1<=i<=7$) lying "on top of each other" by means of which this TCP takes place between these two terminal systems A0 and Z0 (wherein "L" stands for "layer").

The OSI RM thus defines—on the basis of its "7 layers" of always in principle identical "abstractions-semantics" of its Li connections in each OSI connection—the "OSI communications architecture" which in turn is based on this "7 layers structure" of the basic abstractions semantics of all OSI connections. The OSI RM calls each of these basic 7 abstractions layers of its communications architecture—quite independently of individual OSI connections—obviously "Li" respectively, $1<=I<=7$.

Several Li-connections can exist for each "i" in any one individual OSI connection. Each such Li-connection must use for its implementation at least on Lj connection of the same OSI connection wherein always $j<i$—apart from an L7-connection (i.e. $i=7$) which can use for this another L7-connection and an L1-connection which uses for this as a rule a "physical medium"

wherein an Lk-connection ($1<=k<=7$) can be used by several OSI connections or in one OSI connection by several Lk+i connections ($1<=I<=7-k$).

An L7-connection of an OSI connection is often called a "communications connection" since in it of sole importance is the "communication" in the sense of the specific telecommunications process on which this OSI connection is based or of the "communications application system" supporting it (the latter located in at least the two terminal systems of the OSI connection). I.e.: An L7-connection abstracts entirely from the modalities of the information transfer (=L1 to L4 functionality) used in this communication—of a communications application system which where necessary human SUBCs operate in it—, information subdivision (=L5 functionality) and information presentation (=L6 functionality): An L7-connection only knows the "interactions" in this "communications application" communication.

This OSI connection "exists" between A0 and Z0 as soon as one of the TCP SUBCs in one of its two (TCP) terminal systems A0 and Z0 has begun this TCP, thus as soon as this TCP exists—i.e.: both (OC0) and its TCP0) can at this time still be "potential" (see above). Namely from then on the L7-connection of this A0-OC0-Z0 exists for this TCP0 between A0 and Z0. It then remains existing until these two TCP SUBCs regard this TCP as ended (which in the OSI RM would be understood as ending of this L7-connection and OSI connection). The TCP also then remains existing, as "retrospective" TCP (see above), is thus so to speak original compared to its modelling by OSI RM.

In other words: An OSI connection (of a TCP) "exists"

locally not only between the two (TCP) terminal systems A0 and Z0—more precisely: between these two terminal systems A0 and Z0 exists the L3 connection of this OSI connection—but by means of its L7 connection also between the communications application systems and even the TCP SUBCs in these terminal systems A0 and Z0, and temporarily as soon as this TCP has started in one of its SUBCs—more particularly the L7-connection of this OSI connection exists from this moment in time between the SUBCs of this TCP—and remains existing until these two SUBCs consider this TCP as ended.

Accordingly this OSI connection exists at the latest from the moment in time at which some measure for it takes place in a terminal device of the terminal system of the (TCP) SUBC creating it in A0 or Z0. According to the OSI RM and in terms of this patent application it is undoubtedly existing already from the moment in time at which in a SUBC of the TCP on which it is based this was brought about, and even if only prophylactically—e.g. through his explicit or implicit ascertaining of the availability of an emergency number (possibly 911) or his availability for persons calling him.

Any Li-connections ($1<=I<=7$) of this OSI connection need however not yet be implemented or able to be implemented (abstractly) at this moment in time. The existence of an Li-connection thus does not imply its (abstract) implementation or implementability. And more generally: With an OSI connection its at least 7 Li-connections also exist of which however for no j, $1<=j<=7$, an Lj connection—and its cooperation with the other Li-connections of this OSI connection— need be abstractly implemented (the OSI RM does not anyhow consider material realizations/implementations). An (abstract) implementation of an Li-connection is only necessary during its actual (abstract) use.

This implies that the OSI connection remains existing between the two terminal systems A0 and Z0 for this TCP even if in particular at least the at least one L3-connection for the transfer of L3-subscriber data between A0 and Z0 is not implemented in this OSI connection (abstract and/or material)—as often happens in HOs. That the L7-connection of an OSI connection remains existing in an HO case (at least its abstract, where necessary also its material, implementation) can be ensured by means of the aforementioned "HOCIS method" (see Section A. and below on "CI correlation").

abstract "terminal systems" contain in addition to their abstract human users—and/or their non-human users (=user automatons) and/or their aforementioned proxies/part functionalities, all to be understood as TCP SUBCs—abstract "terminal devices", collectively designated below in a terminal system occasionally likewise as "terminal device", i.e. non-human functional groups, such as possibly those of LANs, WLANs, mainframes, data bases, PBXes, RASes, firewalls, switches of every description, but also those of network accesses, IADs, I/O devices. Non-human (abstract or material implementations of) functional groups in terminal systems are frequently called below "modules".

abstract individual "terminal devices" of a terminal system can be considered separately from one another, more particularly a "subscriber terminal terminal device" with its electronic/physical/acoustic/optical/"logical"/ . . . user interface (in this written specification frequently mobile, e.g. in a mobile telephone), a "non-terminal terminal device" with its network-specific "terminal adapter" (TA) for the "network termination" (NT=network terminator") of this network wherein subscriber terminal and non-terminal terminal devices of a terminal system interact with one another by physical/communications technology interfaces and/or further terminal devices, of which as a rule only some are standardised, and a non-terminal terminal device (and even its TA and its NT) can be integrated in particular into a mobile terminal terminal device (e.g. a mobile telephone)—so that the former is then likewise mobile.

Regarding such a subdivision of OSI RM compliant terminal systems into abstract humans and abstract devices it is pointed out that the OSI RM at first sight avoids a terminal systems subdivision, but it however ultimately undertakes same implicitly after all quite clearly. The reason for this is the theoretical necessity for subdividing communications applications, which as a rule are located on the L7 in the terminal systems, in order to understand them in their essence. This necessity led in the definitions for the L7 (in the relevant international standard ISO/IEC 7498 of 1994 and the identical ITU-T Recommendation X.200, inter alia pages 32/33, and its corresponding international standards, such as the ISO/IEC 9545 of 1994 and the identical ITU-T Recommendation X.207) to the definition of the functional structure of OSI RM compliant abstract communications applications which logically by necessity implies the functional subdivision corresponding to it of the terminal systems hosting them, in any case in the area of such applications hosted by them.

The above-mentioned subdivision of OSI terminal systems in this patent application is a special and particularly simple OSI RM compliant functional subdivision of this kind (with the correspondingly simplified terminology introduced above/following for this subdivision) of OSI terminal systems into humans and terminal devices of different kinds therein.

abstract "servers" alias "server terminal systems" alias "terminal systems-without-human TCP subscriber" are functional groups in or on a network—standing under the management of its network operator(s) or not—which in this written specification are likewise regarded as terminal systems/terminal devices, the latter however are not to be subdivided into terminal/non-terminal.

abstract "systems" are either terminal systems/terminal devices or network-integrated computers.

at least one of these non-terminal terminal devices of a terminal system and thus the latter has "access" to more than one network (or a network access point of a network or a network performance feature at a network access point of a network)—in order to be able to carry out an HO, see below—namely by a respective "access point" of a network. Since these two terms are often misunderstood, their two meanings (known to the relevant person skilled in the art) are first explained here (in any case to the extent necessary for this patent application):

This professional "access" definition (in simple words) reads: A terminal system/terminal device has at a moment in time functionally "access to its network" if it at this moment in time can communicate on the OSI layers L1-L3 of its connection to a functional access point of this network in the sense that it can carry out data transfer particularly with all terminal systems/terminal devices of this network which have at this moment in time likewise functionally access to it. From this follows that a terminal system/terminal device of a network need not have permanent access to this—as according to general knowledge is often the case with terminal systems/terminal devices of mobile networks.

An "access point" to this network is thereby a place of transfer of the juristic/commercial/technical responsibility—for the functional capability of these three layers on the data transfer sections (DTSs) of this connection—from the operator of this network to the party responsible for this terminal system/terminal device and its DTSs. The network-side abstract terminating device of these DTSs at the access point is called "Network Terminator" (NT), the user-side abstract terminating device of these DTSs at the access point is called "Terminal Adapter" (TA). These two conceptual functional units, NT and TA, can be integrated as far as possible into a material implementation of a network access point—as is generally the case with mobile telephones. (It should be noted particularly as regards mobile telephones: When this capability of a mobile network telephone for a "direct mobile networks HO" relates to a GSM/CDMA/satellite network on the one hand and a WLAN on the other, it is currently often called "FMC telephone" (FMC=fixed mobile conversion): It then supports namely in one telephone call the use both of the WLAN/VoIP technology widely called nowadays a fixed network technology and also the GSM/CDMA/ satellite technology called mobile network technology).

After this clarification of the terms network "access" and network "access point" with respect to their everyday legal understanding for the relevant person skilled in the art—he knows, too, that these terms can be covered by other concepts which then require however the explicit naming of the respective "reference model" (see: J Schiller, Section A.)—it is clear that a mobile terminal system/terminal device, particularly a mobile telephone, which can be directly involved in an HO, as a rule contains one terminal and at least three non-terminal terminal devices:

Its terminal terminal device serves by definition primarily to implement the functional acoustic/optical/mechanical user interface of a communications process, its three non-terminal terminal devices are as a rule necessary in order for it to be able to cooperate with the two different networks/access points/performance features in an HO: They consist of a functional "switch" for the functional data transmission between its terminal terminal device on the one hand and on the other hand a functional TA/NT each to/for the respective mobile network.

This clarification of the term access point should eliminate at last in this patent application a misconception which arose from the term "wireless access point (WAP)" in recent technical publications relating to internet mobility technology in two respects:

On the one hand this term "wireless access point (WAP)" is used misleadingly as a synonym for "integrated access device (IAD)", thus as a synonym for a device. An (abstract or material) device is however conceptually quite definitively different from a number of legally relevant responsibility transfer points on the Lis of an OSI connection, thus an "access point" of this patent application.

On the other hand, the acronym "WAP" has already stood for many years for something quite different in the field of wireless technology, namely for "wireless application protocol"—which has nothing to do with any "access point" concept, because applications are located on the L7, whilst network access points of the different possible meanings are as a rule located on the layers L1-L3 (and the physical medium lying underneath).

an "HO" alias "HO process" of a terminal system and its TCP (and the OC of both of them)—in a suitable analogy with the above TCP (see details there)—is called "potential", if for it still not one of its change measures was executed in a terminal device, but at least one other measure for it therein (for reasons irrelevant here and in a manner irrelevant here) and/or was addressed already in a terminal system, and "current", if for this one such change measure already took place in a terminal device, wherein this terminal system/TCP in the meantime is called "related" by this HO and "change" stands for an alteration in the case of a network (and its TCP and the OC of both of them) and/or network access point and/or network service feature used by this terminal system during the HO. A potential HO turns thereby to current as soon as for it in at least one of its terminal devices at least one such alteration measure is "started"/"begun", and a current HO "runs" thereafter until the execution of all such alteration measures have been concluded—successfully or unsuccessfully.

the two terminal systems of an OSI connection of a TCP can belong to two different networks—as shown in FIG. 1—so that an abstract "OSI transit system" "relays" (="forwards"/"links"/...) this OSI connection between these two networks. The present patent application sees this abstract "relay system" often as a terminal system of both networks and in any case as a "transit system" of OSI connections relayed over same. This abstract "relaying" is carried out according to the invention for at least one of the abstract Li-connections, $1<=I<=7$, of an OSI connection—in the case of several Li-connections relayed in this relay system by this OSI connection the relaying thereof takes place individually and/or collectively.

It should be noted here that this relaying functionality of a transit system can also extend to at least one potential OSI connection, thus in particular to the producing of an (abstract and/or material) implementation of at least one of their at least 7 Li-connections.

One example of such a relay system is the generally known VoIP gateway between internet and PSTN/ISDN/UMTS over which a telephone call/conversation is relayed between A0 and Z0 (in any case partially), when the A0 is the terminal system at the internet and the Z0 is the terminal system at the PSTN/ISDN/UMTS. The person skilled in the art also knows that Li-connections of an OSI connection between A0 and Z0 can take course—temporarily or permanently—over several relay systems: In this example additionally to the VoIP gateway possibly over a SIP server.

Another example for such a relay system is a WLAN-IAD on the internet. This communicates on the L1-L3 with the WLAN terminal systems by means of the protocols of the "WLAN air interface" of this IAD whilst for the communication with the internet terminal systems on the L1-L3 it uses the corresponding internet protocols—which in the corresponding Li-connections of an OSI connection relayed over one such IAD can require considerable "protocol and data conversions". For their L4-L7 connections the IAD can alter the protocols and data during relaying, or also not.

The relevant person skilled in the art is aware of all this and knows in this respect in particular that Li-connections can have a "tunnel" in order to produce "IP-address-end-to-end-significance" (despite the mobility of at least one of the terminal systems of its OSI connection, see Section A.). Dispensing with this IP-address-end-to-end-significance provides the opportunity of being able to locate the most varied functionalities in a relay—as for example the "mixing of several TCPs with different SUBCs in the relay, e.g. 'the appropriate superimposing of the audio channels of these TCPs' important to the present invention (more on this below)" for the user of a terminal system i.e. SUBC of these TCPs—thus when dispensing with such a "mixing capability" in his terminal system (inter alia because even present-day FMC telephones or PDAs or others do not have a functionality of this type). Therefore it is necessary to differentiate whether the (possible) relay of an OSI connection is or is not concerned with such a tunnel, so that it is also to be differentiated between a "tunnelling-relay"

which is restricted in its functionality and a "tunnel-free relay" therefor. A system can contain/use for one or more OSI connections several relays of different kinds and can then practice these two relaying technologies concurrently where necessary. Accordingly it is differentiated between two types of MHOs, "tunnel-free MHOs" and "tunnelling MHOs", depending on whether an MHO requires for this a tunnel-free relay or even no relay or a tunnelling relay.

It is thus already mentioned implicitly that the present invention fundamentally—exactly as described in the HOCIS method—"mixes" into a "primary TCP (PTCP)" of a terminal system A with terminal system Z at least one "secondary TCP (STCP)" for terminal system A with as a rule at least one other system Y. The simplest examples would be an IP-TV-TCP of A with the TV-server Z as PTCP and during this a VoIP call arriving at A from Y as STCP. If it is desired to practice the netsurfing method with present-day FMC telephones, i.e. to carry out an MHO e.g. into another WLAN in this situation, then this mixing must be swapped into the aforementioned and in this sense "tunnel-free relay" for the PCTP—which does not rule out the use of the tunnelling technology, which definitely offers simplifications, through systems capable of this in the netsurfing method. More on mixing at least one PTCP with at least one STCP follows after the introduction below of "MHO measures".

It should finally be noted: An MHOM of an IAD or similar can use in place of an internet access a different network access, e.g. a PSTN access or an access to a different WLAN over one of its IADs. The tunnelling technology is basically usable whenever the information exchanged over a network is packeted—independently in particular of the switching technology of this network.

a "managed-HO specification, MHOS" always
 is assigned to exactly one real or virtual (see below) homeIAD or homeServer or homeSystem—for which the uniform acronym "homeMIAD" stands—, it thus does not need to be contained therein (wherein a quantity of homeTerminalSystems belongs to one homeMIAD, which only the manager of the homeMIAD can define as such, so that this acronym is a reminder of the security-/privacy-aspect of the MHOS),
 only its manager can define the MHOS and assign it to its homeMIAD,
 is aware of at least two types of "managed-HO-measures, MHO-Me" which are executed in its MHO by means of a homeTerminalSystem controlled by it, namely by a homeMIAD itself containing the MHOS or under its control by another system, of which at least one type causes at least one user communication, and
 specifies the interaction of its MHO-Me executions in an MHO execution,
 wherein for simplicity in the following, homeIAD is said sometimes (in place of "homeMIAD").
 In the sense of the above PTCP/STCP terminology/conceptuality of the HOCIS method each MHO-Me execution which causes at least one user communication is an STCP.
 In a netsurfing method application not all HOs of a TCP on which it is based need be MHOs, but the MHOS causes in this TCP at least one MHO. This is always controlled through at least one MHOS—i.e. several possibly differently defined MHOS can be involved in the control thereof. Conversely one homeMIAD can contain several MHOS.

It is the object of an MHOS of a homeMIAD to define which of its homeTerminalSystems it controls in which MHO in regard which of these measures, i.e. which of these measures for this terminal system are provided in this MHO as interacting with other measures for this. FIGS. 6-8 in section D. discuss distributed implementations of an MHOS (and of the previous MHOM) and their execution capability aspects.

To the types of MHO-Me in an MHOS in this patent application belongs:

An optional type of MHO-Me, the "MHO-control measures, ConMe", which controls and carries out the acceptance monitoring of the use of a netx by a home TerminalSystem in an MHO and where necessary the establishing or the suitable management of a tunnel-free netsurfing connection/relay (see below and above) for A0 and this netx, thus for a tunnel-free MHO.

With another optional type of MHO-Me, with the "MHO-HOCIS measures, HOCISMe" (HOCIS= "HO convenience information support", see Section B.), the most varied of support measures in respect of their potential and current HOs are controlled and provided for the users of the homeTerminalSystems.

For so-called "ComMe-MHOs", which can take place tunnel-free where necessary, at least one "MHO-commercial measure, ComMe"-type of MHO-Me is indispensable, whilst it is optional for MHOs. In both cases a homeMIAD can realise the most varied of transaction measures, e.g. of a promotional nature, with the execution control of a ComMe for its operator—and where necessary for the operators of shared IADs cooperating commercially with it—during an MHO or a ComMe-MHO. The execution of a ComMe thereby always implements a communication with the TCP-SUBC whose homeTerminalSystem is just affected by an HO, wherein the latter must or need not take notice of this communication (i.e. acknowledge it in some way).

Further types of optional MHO-Me are definable or specifiable in any way for or in an MHOS, e.g. in order to make possible the most different superimposings of an IP-TV-TCP into a VoIP-TCP (or vice versa)—and to allow them to be controlled—by whomever.

For reasons of simplification the HO itself—thus the process forming the basis for an MHO—is also regarded as an optional "MHO-HO measure, HOMe".

A single specific MHO measure of this kind is as a rule characterised below by a concluding "0" (e.g. as in "ComMe0" or "HOMe0") and for re-confirmation reasons provided with the prefix "MHO".

Each ComMe-MHO is "CI-correlated" (CI="convenience information") in the following sense: This ComMe-MHO-feature characterises the situation that during a ComMe-MHO execution the execution of its associated at least one MHO-ComMe takes place in connection—implicitly or explicitly—with the execution of an optional MHO-Me. A ComMe in a tunnel-free MHO need not be CI-correlated, but it can be so.

This intuitively perhaps immediately understandable appearing CI-correlation feature of an MHO-ComMe execution with at least one optional MHO-Me execution in a ComMe-MHO, thus for example "of a ComMe with one of an HOMe and/or ConMe and/or HOCISMe . . . " is described more precisely below as a precaution.

A difference is to be made in particular between an explicit and an implicit CI-correlation of this kind, wherein these two types of CI-correlation are completely independent of one another. A specific MHO-ComMe0 (and thus the netsurfing method using it) is as with at least one of these optional MHO-Me0— both in the same netsurfing method— termed "explicitly correlated"—independently of the ComMe0-execution sequence specified below as regards at least one optional specific Me0-execution sequence—if the at least one message communicated by the ComMe0 or by this Me0 (during their executions) to at least one SUBC describes such an association of any kind or it relates to this, and termed "implicitly correlated" if the following applies: There is a TCP for this netsurfing method so that for one of its SUBCs and a (potential and/or current) HO of its terminal system
there is at least one execution of this Me0 and this ComMe0
and the moment of starting of this ComMe0 execution and/or its display at the SUBC consequently is:
later than 30 seconds prior to the starting moment of the Me0 execution and
no later than 30 seconds after the termination moment of the latter,
wherein it is irrelevant whether/when/how the SUBC learns of this Me0 execution.

By means of such a correlations of a ComMe, which the homeMIAD operator—more precisely: its MHOS— undertakes for at least one terminal system managed by him (and its user), the associated ComMe communication is placed "as good as possible" in the TCP (which forms the basis of the netsurfing method application possibly in a VoIP call). And this best possible placing of such commercial communication (not originally requested by the SUBCs and might therefore possibly be perceived by him as an annoyance) takes place during the course of the HO-processes. It can namely be designed here in such a way that it not only "bothers as little as possible" the TCP/SUBC with these commercial communications, but he/it might even regard them as helpful at this moment— which decidedly improves the client-acceptance/effectiveness of such commercial communications. And to bring about such "most favourable moments" on the occasion of all HOs as far as possible is the object of HOCIS activities designed appropriately for this. On the basis of its CI-correlation feature—which in turn accepts all optional MHO-Me as correlation foundation—the netsurfing method thus makes it possible in a simple way to transform the would-be disturbance potential of an HO in a VoIP call into the just described convenience and commercial potential of this HO. This CI-correlation of ComMe-MHOs may thus be regarded as convenience-creating—hence its name—even if for its optimum "productivity development" in a netsurfing method it is as a rule indeed an HOCISMe correlation.

To conclude this discussion on ComMe-MHOs it should be noted that it is anticipated by the authors of this patent application that in future most MHOs of the netsurfing—thus also in those cases where a ComMe or the CI-correlation thereof can be dispensed with (see claim 2)—will put into practice the commercial use of HOs just discussed for ComMe, because their costs/use balances speak for all parties involved.

The latter more precisely: This MHOS-/ComMe-MHO technology implements the two basic principles of the Wsurfing method according to the invention:

On the one hand the more economic basic principle of making company-internal homeIADs into the mainspring of novel expedient economic activity of their operators within the scope of particularly VoIP calls, as far as possible with the participation of public shared IADs, and on the other hand the more social basic principle of making available more comfortable more powerful communications technology in all urban centres rapidly and more cost effective to everyone for their future multimedia terminal systems (more particularly for the use of their IP-TV capabilities), than this is possible solely by means of present-day mobile network technologies (on the basis of GSM, CDMA, UMTS, Wimax, . . . and derivatives thereof)— wherein this will remain significantly as "fall-back technology" wherever the shared WLAN technology is not or not cost-effectively available.

Some simple examples of the and remarks on this CI-correlating MHOS-/ComMe-MHO technology can illustrate this. By means of an optional MHOS0/function1, assigned to a homeMIAD0, the latter decides before or at the beginning of an HO of a WiFi telephone A0 (which is a homeTerminalSystem of homeMIAD0), whether this may carry out an MHO to an IAD1 with its current TCP/OC0 to another telephone Z0 (which is relayed over an MHOM0) (=MHO-ConMe), an optional MHOS0/function2, likewise assigned to the homeMIAD0, this informs prior or at the beginning of the arising HO the two SUBCs of this TCP about the potential and/or current HO execution (=MHO-HO-CISMe), for a ComMe-MHO obligatory MHOS0/Function3, which is likewise assigned to this homeMIAD0, the latter (or its MHOS) practices a commercial measure, possibly the communication of a promotion reference to the user of the homeMIAD0 homeTerminalSystem involved in this HO or the two SUBCs of its TCP— wherein this additional technical communication takes place once or several times and at any time (which is irrelevant here) before or during or after this preceding decision (which is irrelevant here) (=MHO-ComMe).

From this small example it is clear that the execution of this MHO-ComMe takes place best when CI-correlated with the execution of the preceding MHO-ConMe (wherein this CI correlation does not require the execution of this MHO-ConMe to be communicated to one of the TCP SUBCs), first of all however with the execution of the preceding MHO-HO-CISMe—wherein the CI-correlation particularly in VoIP calls now makes use as a rule of the fact that the execution of this MHO-HOCISe communicates as a rule in any case always with both TCP SUBCs. This does not mean however that the use of the netsurfing method would only be possible when using the HOCIS method as well: The former is technologically seen absolutely independent of the latter, and also as regards contents MHOs of the netsurfing method can be envisaged in which a CI-correlation of an MHO-ComMe with an MHO-HOCISe makes very little sense.

Thereby:

both such decision makings (based on such MHO ConMe) of the homeMIAD0 and also its definitively communicative HOCIS and commercial measures can be designed interactive in the sense as is generally known for example from an IVR system—interactive by way of example both with terminal system users in the shared IADs supported by the homeMIAD0 and also with its other business partners.

the MHOS can provide for at least one communications status, and this can be detected/modified/evaluated by the homeMIAD0—e.g. by means of its MHO-Me—and can be taken into consideration for example in the aforementioned decision, and this CS can have the effect described below on such a decision.

these MOHS-controlled MHO-Me of the homeMIAD0 can be shaped context-sensitively (thus for example can be conceived differently during a potential TCP/OC than during a running TCP/OC) and/or multimedial (thus for example after or simultaneously with an audio signal to a SUBC to copy textual or graphic information for him to his terminal system concurrently and where necessary without interfering with the VoIP audio information).

in any abstract and/or material implementation of any MHO-Me all the MHO-Me types can be interwoven with one another so closely that they cannot be identified as such individual types by any of its related terminal system users, and a homeIAD operator can for at least one and/or all entities of its homeTerminalSystems (e.g. those of their OCs and those of the latter itself) define MHOS which are the same as regards content or different and can design them correspondingly sophisticated or very simple. The latter means: To specify in an MHO-ConMe always only trivial restrictions (such as for example: "new MHOM-host-system=homeIAD" and "new terminal system=homeTerminalSystem") and in an MHO-ComMe always only to dictate trivial user communications (such as for example "at HO risk for terminal system Ax>'1× audio short signal' and 'current shared IAD operator ID flashing' and 'signal strength flashing'"

"at HO start for terminal system Ax>'2× audio short signal' and 'current shared IAD operator ID bye announcement'" and 'signal transfer flashing'"

"at HO end for terminal system Ax>'3× audio short signal' and 'new shared IAD operator ID hello announcement'" and 'new signal strength flashing'"

"at HO failure for terminal system Ax>'7× audio short signal' and '3× audio long signal'").

Whereas it is possible to think of the communication of audio short/long signals as HOCISMe, the shared IAD operator ID announcements are definitively (rudimentary) promotion-info communications. Such MHO-Me can be specified globally for all or selectively for individual homeTerminalSystems in an MHOS, and the latter can also be preset fixedly configured (all of which is however irrelevant here since these are questions of design and material implementation of the invention).

The relevant person skilled in the art knows that the MHOS of an operator of a virtual or real homeMIAD in a material implementation (=embodiment) of the Wsurfing method is a specification in this homeMIAD which is entered anyhow into this by its operator partially or totally or/and is already contained therein and is only configured by the operator and/or is fixed preset therein, and the—belonging to this MHOS—MHO-Me of this homeMIAD are implemented by the interpretation of this MHOS by this homeMIAD. He also knows that any special MHO-ComMe and their special CI-correlations do not belong to the essence of the invention, but only the fact that there are both in each (claim 1-conforming) MHOS, so that in any case each ComMe-MHO is characterised by the very special technical feature of a "CI-correlation restricted" communication between the user of the "MHO" terminal system and its homeMIAD for implementing an MHO-ComMe of this type—but also other MHOs can have this characterisation.

the attribute "homeMIAD private" of the MHOS serves only to emphasise the "privacy" of these previously characterised MHO management measures for and only for the operator of this and only this homeMIAD. It should thereby be noted: The abstract homeMIAD operator can be realized by two different material persons—an abstract "operator" can stand for a "material operator person and/or a material manager person".

This privacy thus rules out that a second party—in addition to this homeMIAD operator as the first—learns about or sets or modifies the private MHOS of his homeMIAD without the knowledge and consent of the first. If this second party is in particular an operator and/or manager of a network of any kind (which is not the network of this homeMIAD) or a service (which is not the service of this homeMIAD) then these MHOSs are neither accessible nor comprehensible to him. This privacy does not mean however that a second party would not know or may not know which MHOSs a homeMIAD operator can actually fundamentally assign to it. Details will not be provided here on the encoding of SUBC information which is ultimately required for this and is already known.

there are two types of homeMIADs: a "real and a virtual homeMIAD" type, both types where necessary both in abstract and also material implementation. For each homeMIAD—real one and likewise a virtual one—there is conceptually exactly one "logical" manager and a "physical" operator. With a real homeMIAD its manager and its operator are identical—which need not be the same in both implementations.

the preceding linguistic use already makes it obvious that in this written specification both the terms/conceptions "MHO", "MHO method" and "MHO process" and also "MHO PDU" and "PDU" (PDU=protocol data unit) are sometimes each used as synonyms—thus slightly simplifying the terminology in the sense of its slight coarsening up—(although this in the first instance is inadmissible per se, since an abstract "process" is always an abstract application of an abstract "method", i.e. its abstract "application instantiation").

the clarification is finally carried out of some further terms/conceptions adapted to the situations of this patent application.

"homeWLAN" alias "homeNet". In this written specification a terminal system A0 is assigned administratively to a homeWLAN alias homeNet and its according to the invention at least one real or virtual homeMIAD. A0 is for this homeWLAN/homeNet/homeMIAD a "homeTerminalSystem". The simplest example for a homeMIAD/homeWLAN/homeNet according to the invention can be implemented by means of a WiFi IAD/WLAN and its homeTerminalSystem A0 (a single person with WiFi telephone). This WiFi telephone A0 can then by means of any shared WiFi-WLAN Wx alias Netx according to the invention Wsurf/netsurf, as long as A0 can "check in" at the Wx/Netx (see below) and the homeMIAD of A0 according to the invention contains an MHOS/MHOM (and this is ready to operate a Wsurfing connection with the IADx of Wx/Netx).

This generally known homeWLAN/homeNet term is in this patent application firstly extended to the WLAN/net term used here (see section B.). Secondly it is extended to possible "non-actually" associated homeTerminalSystems, e.g. telephones such as an A0 mentioned above—wherein this non-actual "home" feature of a terminal system can be caused by any one IAD/server by a CS (see below), possibly its own or that of its OC or that of its TCP or its other terminal systems or of the entire homeWLAN or of this IAD/server or . . . . A CS thus can have the effect that an OC of a terminal system or TCP can or even must be relayed by an IAD/server, e.g. with an MHOM actually responsible for this, even if this terminal system is not an actual homeTerminalSystem of this MHOM/IAD/server (in the aforementioned sense). In this patent application both its actual and also its non-actual homeTerminalSystems belong to a homeWLAN/homeNet/homeMIAD/MHOM.

a "Checking in": A terminal system A0 which receives the electronic signal e.g. of a WiFi-WLAN or another network can use this for communication—more particularly over the internet—, as a rule only after it has applied for authorisation to use this network with at least one of its (possibly several) IADs or base stations or . . . . If this authorisation is granted to it then A0 is checked in at this network. The procedures or protocols between A0 and this IAD/base station, according to which this request for and granting of or also tendering/accepting of rights to use a network takes place, are irrelevant for this patent application. However it may just be defined: A0 is regarded as "reachable" at a netx if A0 is or can be checked in at this netx. Where necessary it is sufficient that A0 is or can be "Wsurfing-checked in", as explained in section D.—wherein possible modalities and implementations of such a check-in restriction or restricted check-in possibility are irrelevant in this patent application.

"netsurfing connection (NSC)": This is at least an L3-connection of an OC0 segment of the OC0 between A0 and Z0, namely that between A0 and a system S0 in/at a WLANx/netx, which is different from the homeWLAN0/homeNet0 of A0.

"Communications status CS": It was already explained above that a TCP/OC of a specific communications application on the basis of the Wsurfing method (for example with TCPs with specific features, such as emergency calls or cost-reduced calls of all kinds or customer service calls or calls to be monitored or calls from under-age persons or calls from specific wide area networks or WLANs or locations or occurrences or for certain times or . . . ) can be characterised by features which result for a terminal system A0 in it being given preferred treatment while it Wsurfs—e.g. in that its OC can or even must be relayed, by whomever, if it is only technologically suitable for this (wherein the commercial or legal or other type of substantiation for the necessity/suitability of this preferential treatment in this patent application is not considered, but only the fact that it may exist or not).

This CS (communications status) can however also include a discriminatory or otherwise relaying handling of an OC—by whichever IAD/server and however, up to a total relaying refusal, i.e. deprivation of a "home" feature for entities.

The CS of a method/apparatus according to the invention or the entities of an OC0 (see below) thus impairs such feature sets of the relaying of OCs.

"Entities of an OC0": By this are meant here both the Li-entities of its Li-connections and also the Li-connections themselves, the at least one network required for their implementation and where applicable further means which are necessary for this.

Figure 4:
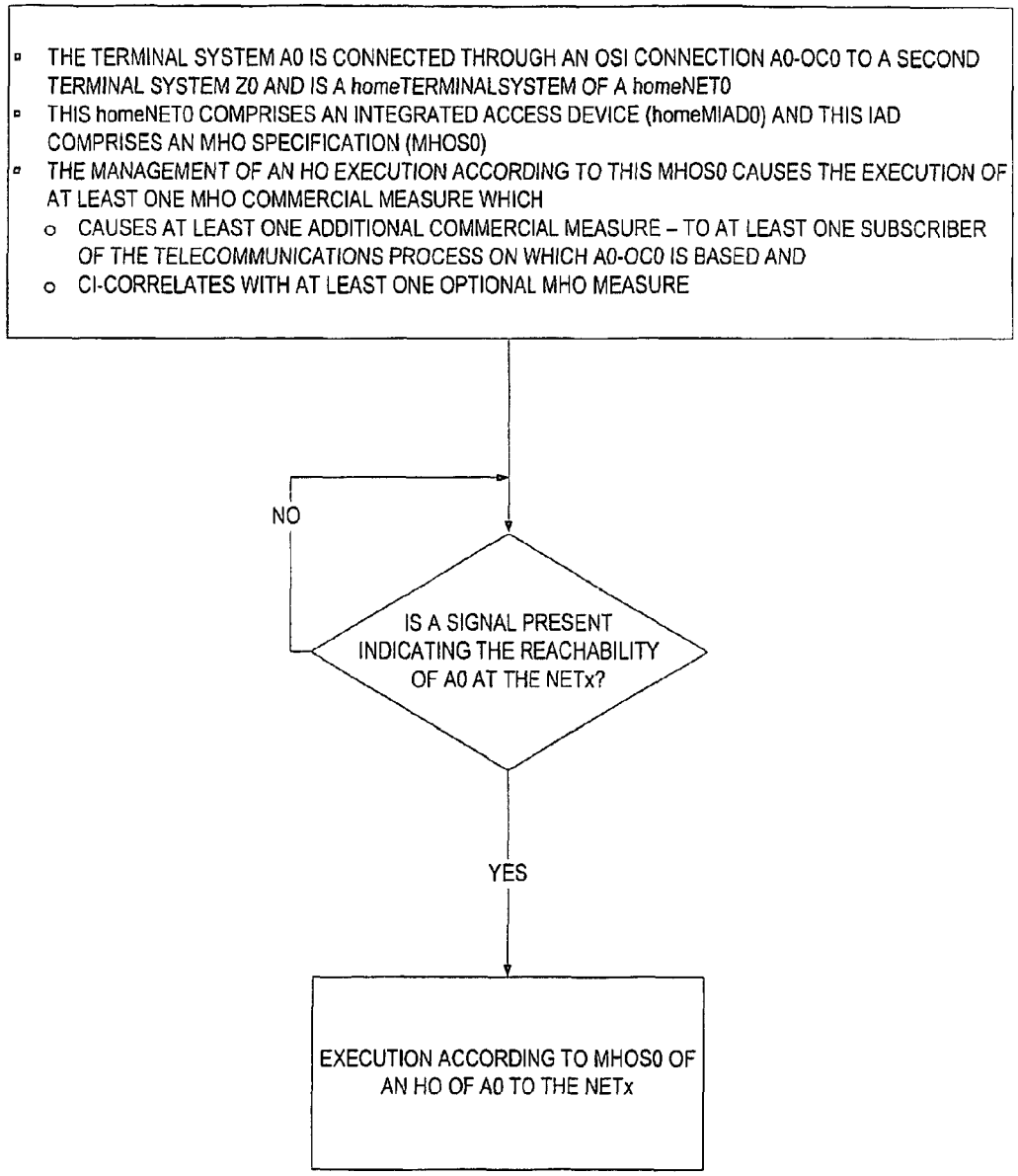
FIG. 4 is a flow diagram of a handover process according to one aspect of the invention.
Figure 5:
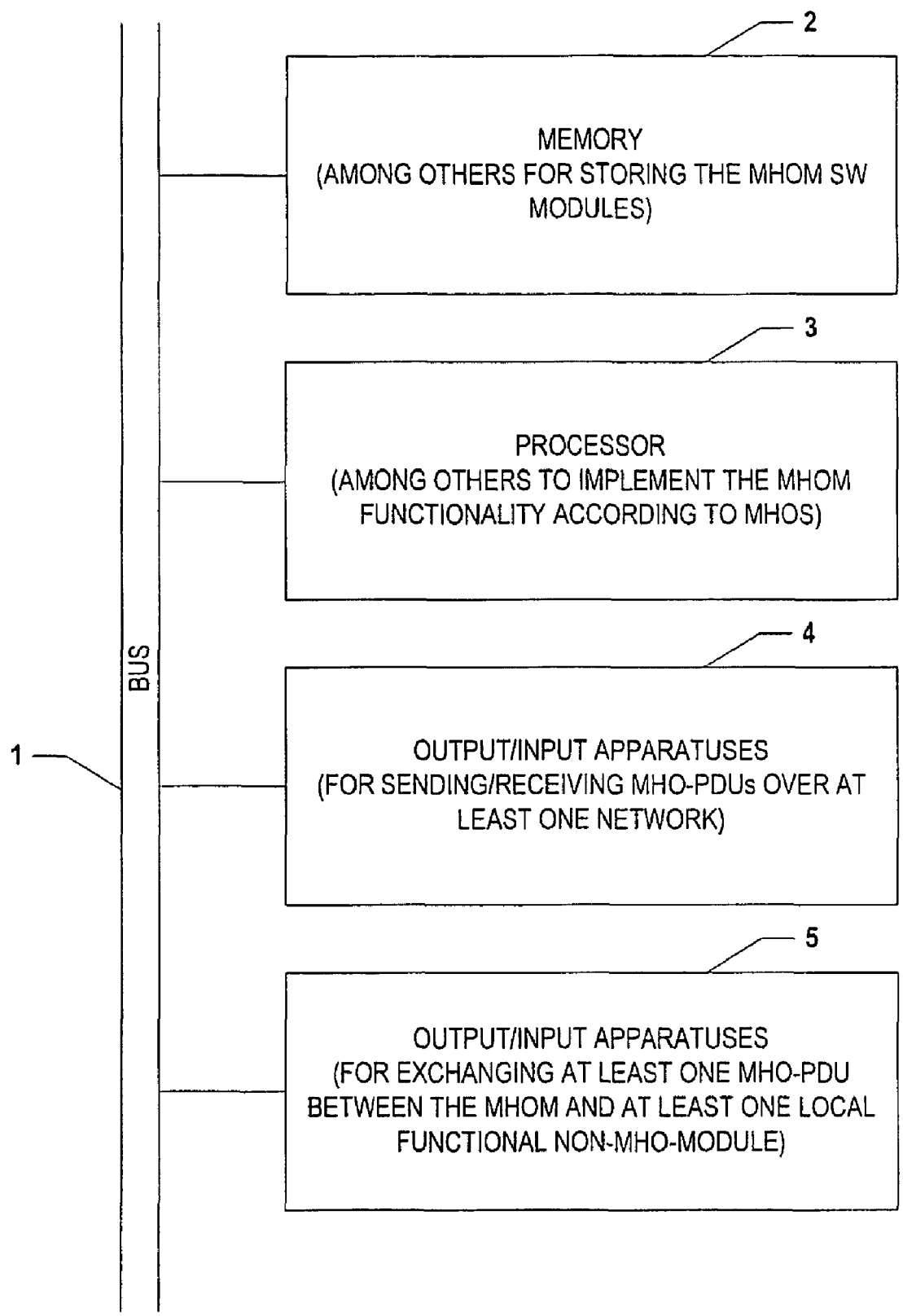
FIG. 5 is a schematic block diagram of hardware and software components of an apparatus according to one embodiment of the invention.

The flow chart in FIG. 4 shows the method steps of the claim 1. FIG. 5 shows the HW/SW components of the abstract means of an apparatus according to the invention according to claims 14-16. To the bus (1) are as a rule connected: the memory (2) for storing inter alia the MHOM-SW modules, which contain the MHOS, the processor (3) for implementing inter alia this MHOM functionality according to MHOS, the output/input devices (4) for the MHO-PDU-transmitting/receiving over at least one network, the output/input devices (5) for the exchange of at least one MHO-PDU between the MHOM and at least one local functional non-MHO-module (where applicable implemented by a local coupling apparatus with a means of the apparatus main claims.)

Accordingly this written specification considers in particular its abstract netsurfing apparatus to consist of abstract HW/SW functional components, wherein this assignment of a functional netsurfing apparatus component to the HW/SW is entirely irrelevant. It is only important that the abstract implementation of the functional components of an abstract netsurfing apparatus can take place by means of independent functional netsurfing apparatus HW/SW components or functionally identical and/or functionally suitable terminal system/IAD-HW/SW components or functionally identical and/or functionally suitable HW/SW components of other systems (for example of an operating system and functional HW components managed by the latter).

Thus apart from the first case an "abstract HW/SW resource sharing" takes place between Wsurfing apparatus components and functional components of the other named systems. This abstract HW/SW resource sharing may or may not be found in a material implementation alias embodiment of this Wsurfing apparatus and in the first case is called "material HW/SW resource sharing". I.e.: An abstract implementation of a netsurfing apparatus in an abstract netsurfing apparatus terminal system/IAD can co-use there functionally identical or functionally suitable abstract HW/SW components e.g. of an operating system (and abstract HW components managed by the latter) through abstract resource sharing.

Conversely: An abstract implementation of a netsurfing apparatus which is to supplement an abstract terminal system/IAD to be supported by the netsurfing method requires for this in some circumstances no further HW expansions of this abstract terminal system/IAD at all, since its abstract HW components are sufficient for this abstract apparatus implementation, i.e. this can be accomplished by means of "abstract HW resource sharing" with the abstract terminal system/IAD which is to be supported. This can then also apply for a material implementation of this netsurfing apparatus terminal system/IAD by means of a material terminal system/IAD and its material HW components.

The discussion above on the modelling of the abstract HW/SW components of the means of a netsurfing apparatus serves to explain the purely functional nature of the means according to the claims wording/content—from the implementation of which through a concrete "netsurfing-suspect" embodiment it is to be decided whether the latter does or does not encroach in the protection range of this written specification.

This patent application is at the present time primarily aimed at embodiments of the netsurfing method/apparatus which are as regards their material HW components fully implemented by means of the material HW components of the material terminal systems/IADs which are (are to be) supported by such embodiments—i.e. overall only comprise additional (netsurfing apparatus conditioned) material SW components. The material implementation of such a netsurfing apparatus is consequently based on its material resource sharing of its material HW components with those of the supported material terminal systems/IADs.

That the material implementation of the netsurfing method is entirely possibly by means of material SW components is elementary to the relevant person skilled in the art. And he also sees straightaway that all means of a netsurfing apparatus claim can be implemented materially by means of SW components—insofar as they are not based on the abstract HW components of FIG. 5 which for their part can be implemented materially by material resource sharing (see above). The protection range of this patent application is however not restricted to such special embodiments but these may contain where necessary additional netsurfing-specific HW components.

D. More Extensive Descriptions of the Invention

This section D. is meant to help avoid the meaning and/or protection range of the present patent application from being determined from and restricted to its very limited examples of embodiments—which is indeed "patent logically" absurd and more particularly in terms of patent law strictly inadmissible, but which has happened nevertheless to the authors of this written specification in legal disputes in the case of others of their patents and therefore has a very strong impression on the wording of this patent application—and not from its intentionally more abstractly formulated and therefore clearly wider reaching claims wording. The prime point of the method of interpretation, i.e. of the method of determining the content, of a patent from its claims wordings (compared to all otherwise possibilities of a method of interpretation/method of determining content of a patent) is namely fixed unmistakeably in all patent law standards.

For these two reasons section D. describes below the essence of the invention of the present patent application also by means of a slightly laborious explanation of its method claims. A repeated and comparably intricate commentary on the apparatus claims after this seems unnecessary. Section D. is thus part of the description of the method/apparatus according to the invention.

Firstly a reminder of three aspects—already mentioned in part in this written specification:

The individual features of the method/apparatus according to the invention are not subject to any restriction not mentioned in this written specification—more particularly no restriction through a "general context" of the individual features of the method/apparatus according to the invention, by whomever such a "general context" may be supposed and however it may be construed, since it would not be justified by any word in this written specification.

Since all the claims wordings/contents of this patent application define these features of the method/apparatus according to the invention solely in its essence, this written specification says absolutely nothing about the material implementation versions of these features in any one embodiment of the invention—rather these features are "functional" alias "abstract", thus purely "conceptual".

In this written specification (including its claims) the syllable "a" (without any "at least") and all conjugations/declinations/versions thereof stands for "at least one"—wherever this substitution is reasonably possible somehow.

Now to claims 1 and 2: The first paragraph thereof identifies the fundamental terms/features of the telecommunications arrangements with which the Wsurfing method works.

For this it should be reminded on the one hand that in this patent application an OC0 according to claims 1 and 2 (see Section C.) need only be potential. A known example for this is an OSI connection which conceptually comes about at the latest with the decision of a SUBC to start a call to any emergency number, possibly with 911 or 112—i.e. it exists (in a potential way) from the moment when the (abstract) SUBC (as part of the abstract terminal system A0) is thinking of calling it. Another example of this is a potential OSI connection between the A0 subscriber and a potential Z0 subscriber for which the former would like to be reachable if the latter is calling him, wherein for the moment in time of the MHO it is assumed that there would indeed be such a Z0 subscriber—an assumption whose justification is irrelevant here (but not unjustified) In the event of using the IP-TV communications application its potential OC0 exists at the latest as soon as the user of A0 undertakes a "program selection" thereon.

Reference is also thereby made to an ineffective word abbreviation in this written specification: When we speak about a "TCP between A0 and Z0" we always mean here a "TCP between one of its at least one subscriber in A0 and Z0 respectively".

On the other hand mention has already been made here about features
in claim 1 about an "MHO-ComMe" and
in claim 2 about the relaying of the A0-OC0
which embody none of the methods of the state of the HO art or of the internet mobility technology: Such HO-management features were completely unknown up until now (see for this sections A. and C.).

Also brief explanations are indicated for steps a)-b) in claims 1 and 2 whereby it ought to be clear a priori that there are further steps—not mentioned in a)-b) but obvious to the relevant person skilled in the art—and therefore not worth mentioning here but which the netsurfing requires.

The execution of an MHO according to claim 1/2 of A0 to a netx is started by the at least one-time execution of the check step a) by its discovery of the "presence of an availability signal by A0 at the netx". Since the previous descriptions of the invention nowhere restrict this, the meaning of this wording a) is just what might be expected: There is a signal—of any kind and is discovered anywhere anyhow—the presence of which signifies: A0 can in the netx, because A0 is or can be checked in there, communicate by means of its IADx or BSx and its homeMIAD0 with all terminal systems in the complete internet and is reachable by them in the netx (see beginning of B. and end of C.).

An abstract or material implementation of the steps a)-b) can conduct a time overlap of them in any way—the relevant person skilled in the art knows for example that a separate preliminary check in a) is not necessary in order to execute a) and b). In particular according to the wording/meaning a one-time or repeated execution of the check a) can be carried out.

The execution according to claim 1 or 2 of an MHO can in a material implementation—in addition to steps a)-b)—require/imply/use further steps which where necessary can take place automatically and/or comprise further or alternative optional MHO-Me, such as for example for the use of IP-TV. I.e. claims 1 and 2 mention absolutely nothing about any questions of the material implementation of their methods, e.g. when and how and under what conditions the actual checking-in of A0 in the netx can and/or must take place. For the relevant person skilled in the art it is however clear that in some circumstances none of the method steps required for checking in need be executed, so that the MHO can be started and/or carried out and/or completed according to a)-b) (as may be possible particularly with the implementation of the internet IPv6 on terminal systems/IADs/BSs/ . . . ). I.e.: The net/Wsurfing method can proceed completely and repeatedly although the netsurfer or his terminal system has checked in nowhere or in any case not at the real or virtual distributed or locally implemented IADx/BSx which is executing it prophylactically where necessary. The same applies for its prophylactic establishing and/or maintaining of a complete or partial netsurfing connection NSCO for A0 and the A0-OC0 and/or IP-TV connection and/or other optional MHO-Me connections for A0 (e.g. for any security-relevant references to its user and/or its security supervisor at another place) before the checking in/and or out of A0 at the netx, wherein the A0 user learns about such prophylaxis and/or does or does not make use of it.

For the relevant person skilled in the art thus no such version of the method according to the invention, of which only some are mentioned here explicitly by way of example, are ruled out from the claim 1/2 wording/meaning and the description thereof in this patent application. This means that the claim 1/2 wording/meaning—in any case as a result of this description of the method according to the invention—comprises all such versions.

The Wsurfing method according to claim 1 permits the use of both relaying methods (both the tunnel-free relaying and also the tunnel-relaying, see for this claim 3), thus contains no "tunnel-freedom" restriction for this. However its MHO is subject to a restriction in respect of claim 2 insofar as it has to implement a ComMe and its CI-correlation. These restrictions however in practice do not appear as such but as a benefit of the netsurfing method (see section C. for the advantages of a ComMe and its CI-correlation in an MHO).

An abstract relaying relates to each bit transferred in A0-OC0. However each material implementation of the netsurfing method will proceed so that it needs to ensure the implementation of this "tunnel-free" relay feature only with certain conditions (such as the volume in the A0-OC0 transferred information). The relevant person skilled in the art knows how this happens and under which circumstances and why this is reasonable.

With regard to the claim 1/2 wording/meaning it is finally pointed out that the versions of the abstract or material implementation of a "management according to MHOS of an HO execution" (under the control of the real or virtual homeMIAD0, implemented locally or distributed, and its respective MHOS parts), in any case after the preceding explanations, are known to the relevant person skilled in the art and are thus irrelevant here—that thus as regards its abstract or material implementation it is restricted in absolutely no way, and the "additional commercial communication"

requires neither an additional PDU exchange (but it can take place by means of a PDU exchange which is anyway necessary), nor is restricted as regards the network used by it (thus can use a different network from that which is being used anyway).

As regards the protection range of the claim 1 or 2 this implies in particular: As soon as an embodiment discovers the presence of a signal according to a) by means of some (supposed) non-MHOM (which in this written specification is restricted in no way) and thus the successful execution of the step b) is brought about in some way, it (jointly with this non-MHOM) encroaches into the protection range thereof.

By means of the five FIGS. 6a-e in addition some basic clarifications are provided regarding telecommunications arrangements in which the net/Wsurfing method can be applied, in which its MHOM and/or its virtual or real homeMIAD and/or its MHOS are implemented abstractly or materially distributed. For simplicity it is assumed in FIG. 6a that a system S0 with a part of a virtual homeMIAD can only control and where necessary execute ConMe and a system S1 with another part of a virtual homeMIAD can only control and where necessary execute ComMe (the two both completely). The three FIGS. 6b-d only differ from it insofar as in 6b-c respectively one of these two and in 6d both MHO-Me types are located in a real homeMIAD0. It should thereby be noted that S0 and/or S1 and their virtual homeMIAD parts (in FIGS. 6a-c) can be located in a telecommunications network, whose operator then thus supports the Wsurfing method—so that then in these cases a where necessary further real homeMIAD can be set up functionally simpler than in FIG. 6d, more particularly can be a present-day installed shared IAD (see below). Naturally there are a number of mixed forms of these prototype telecommunications arrangements for a netsurfing method/apparatus—which are revealed with the claim 1/2 wording/meaning and the previous description. To sum up: All forms or structures of abstract and/or material distributed implementations of the method according to the invention are for the relevant person skilled in the art covered by this description of the claim 1/2 wording/meaning.

Figure 6A:
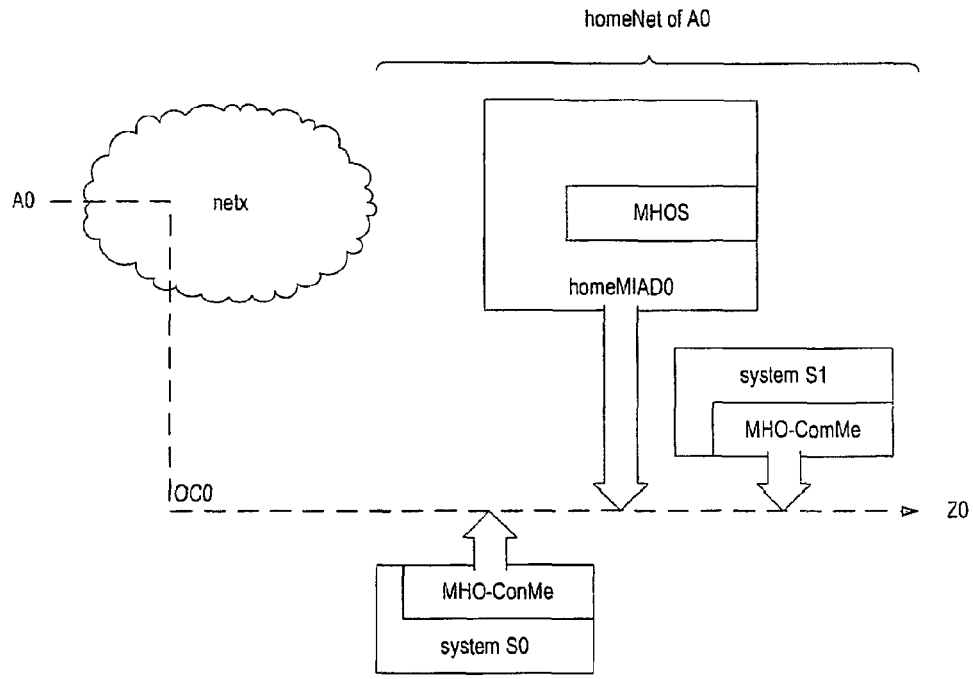
FIGS. 6a-6e show examples of telecommunications arrangements to which the method according to the invention can be applied.
Figure 6B:
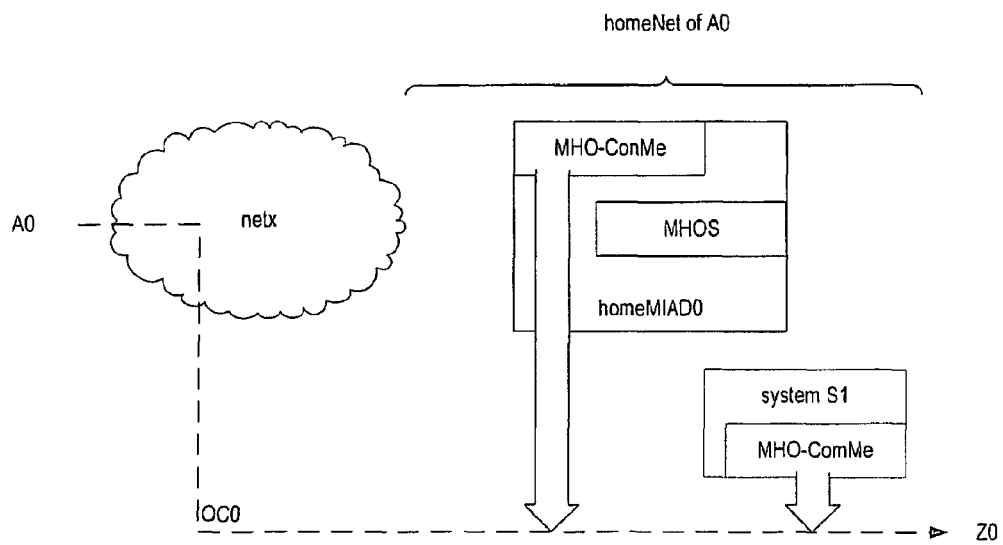
Figure 6C:
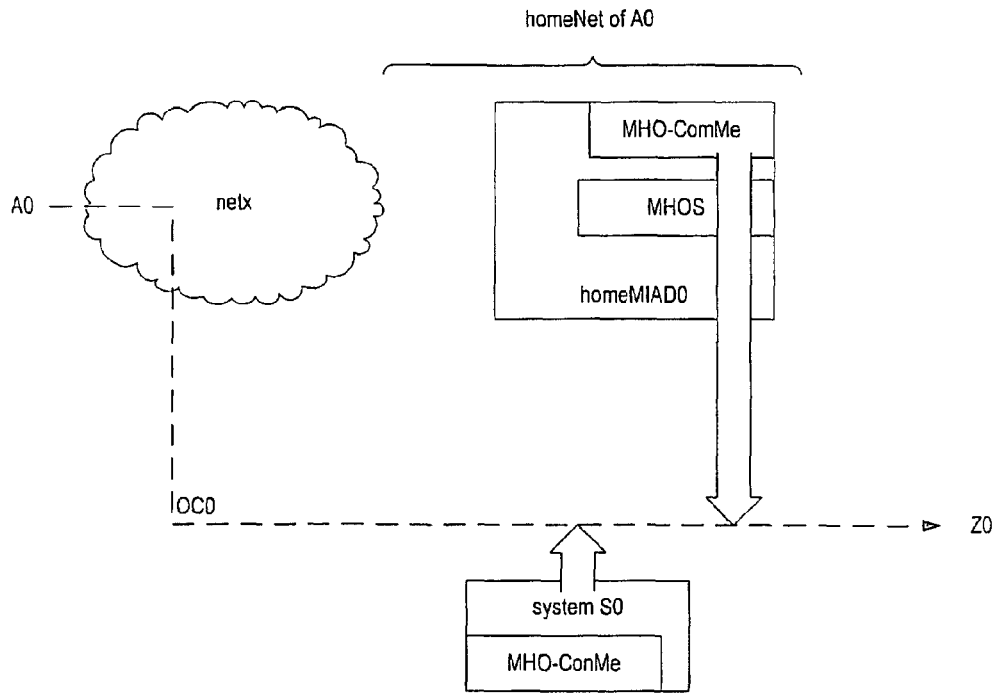
Figure 6D:
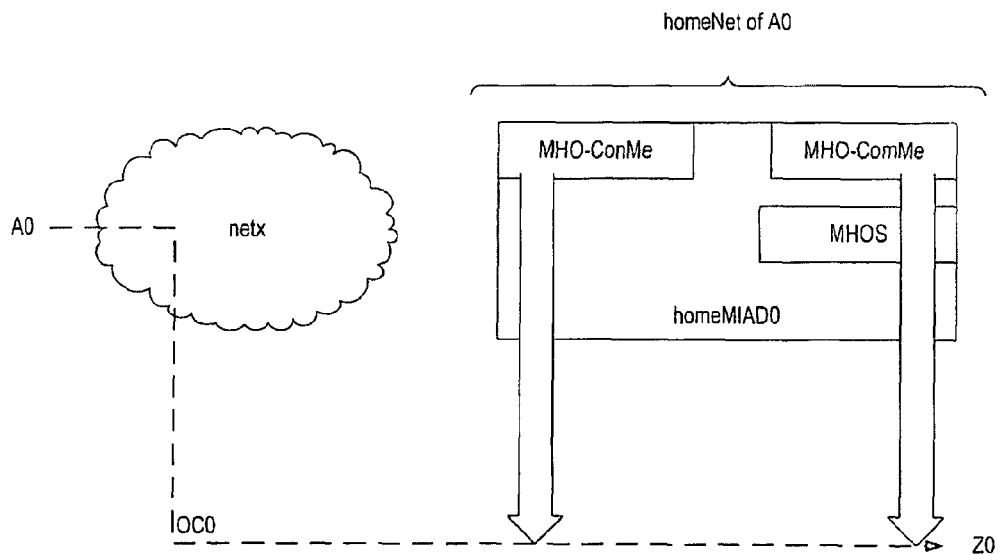
Figure 6E:
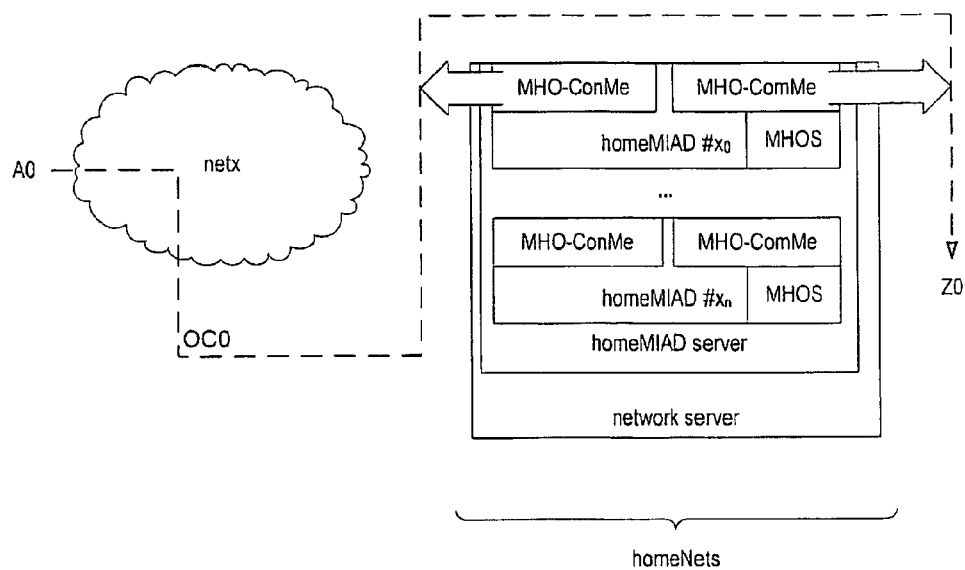
Figure 7A:
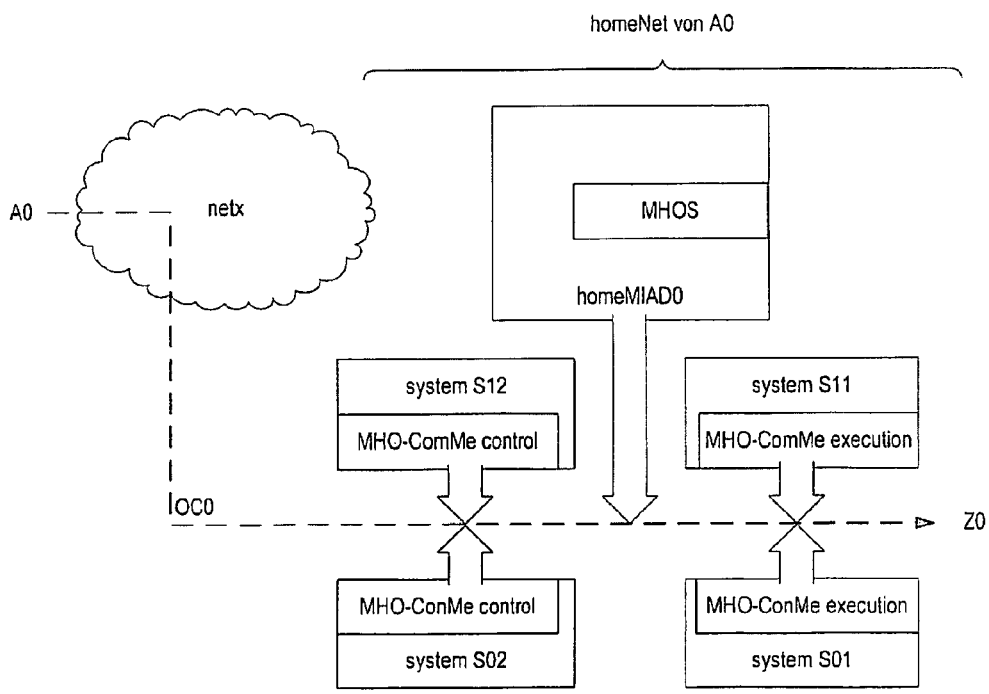
Figure 7D:
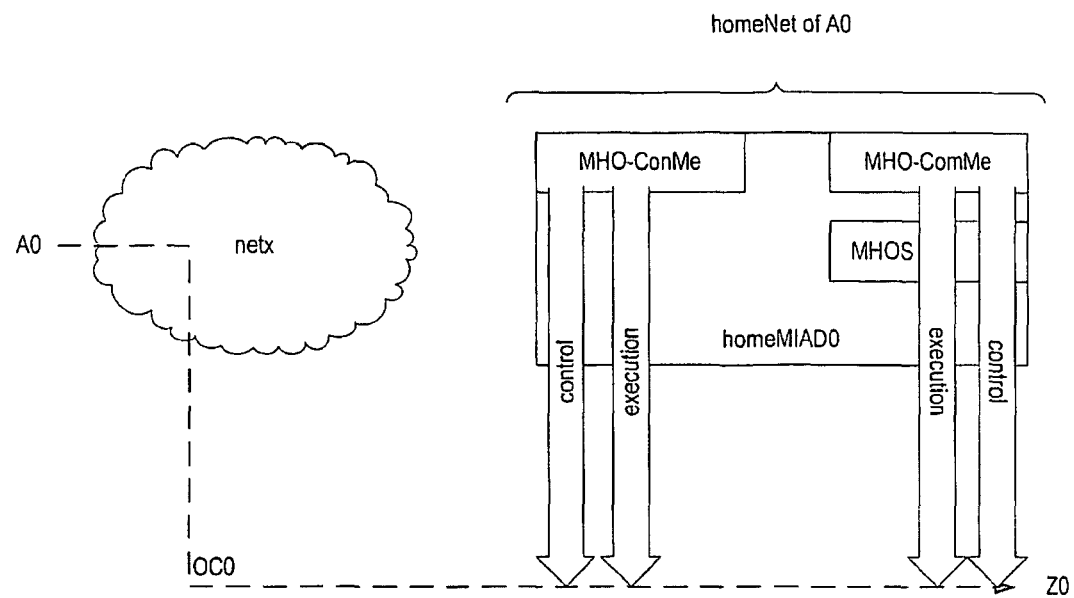
Figure 7E:
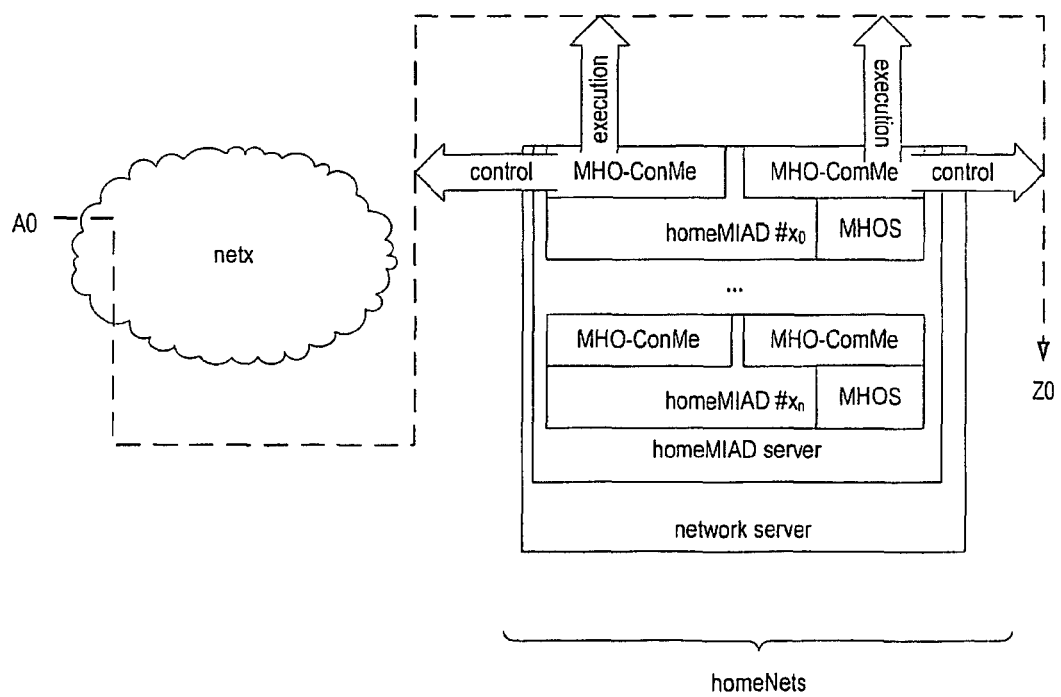
Figure 8A:
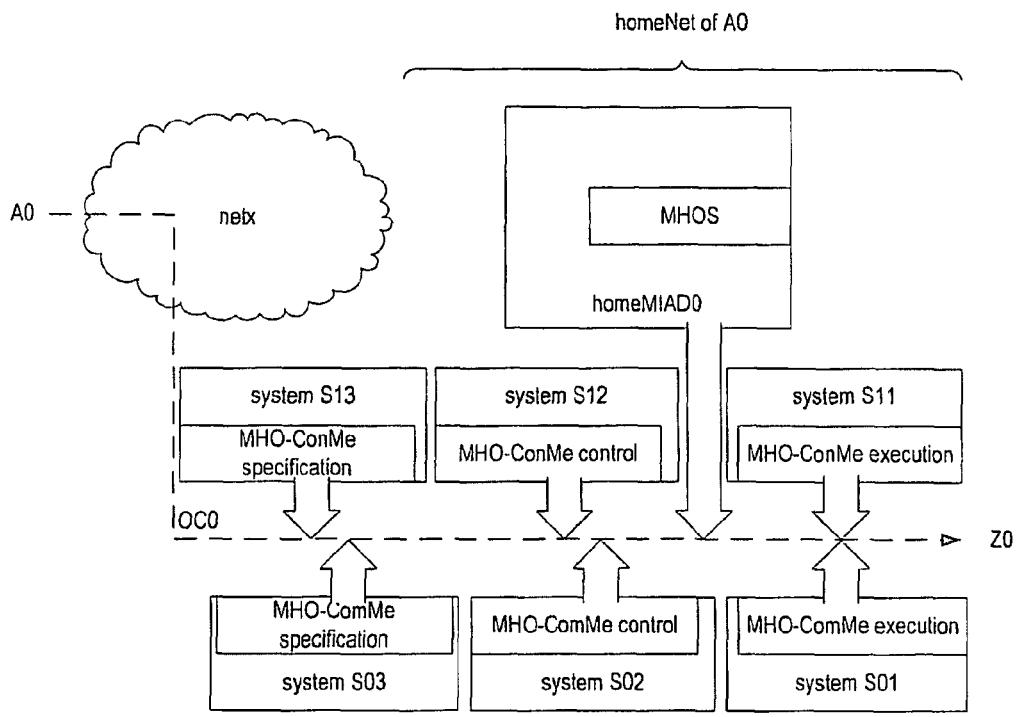
FIGS. 8a-8e show additional examples of telecommunications arrangements to which the method according to the invention can be applied.
Figure 8B:
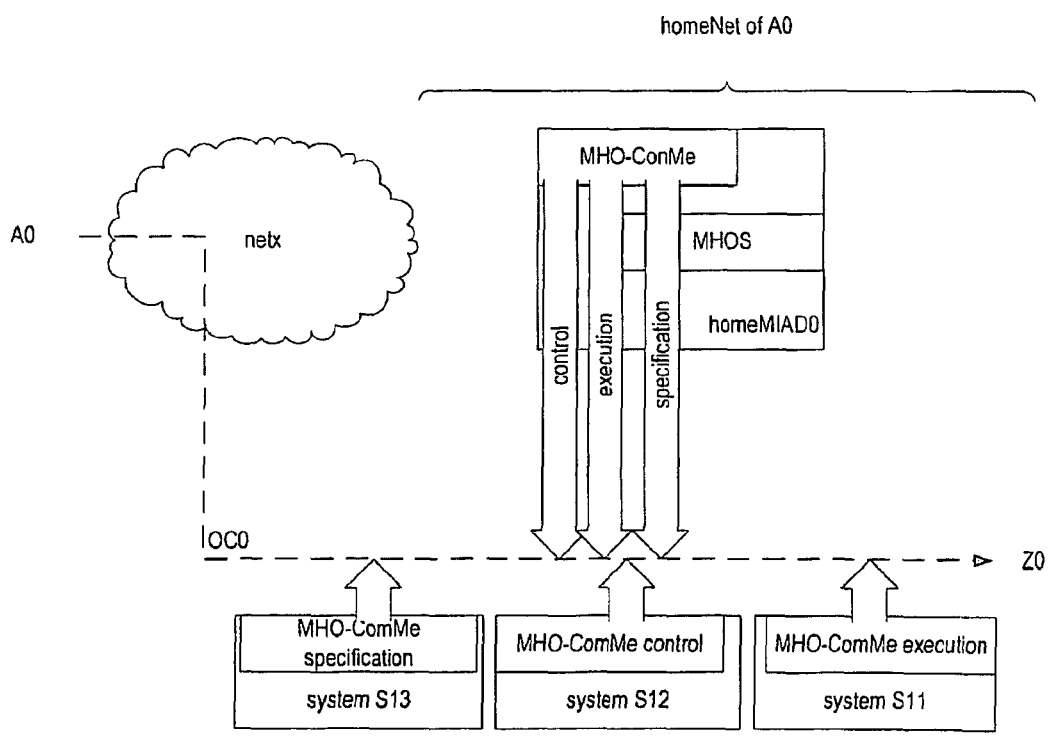
Figure 8C:
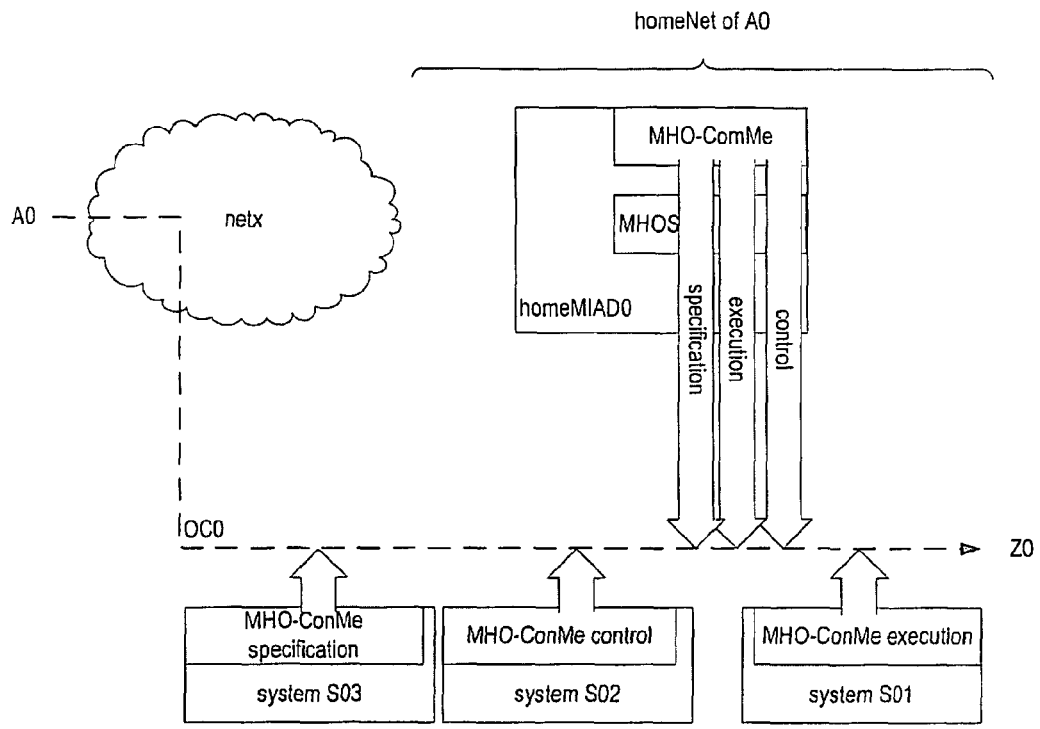
Figure 8D:
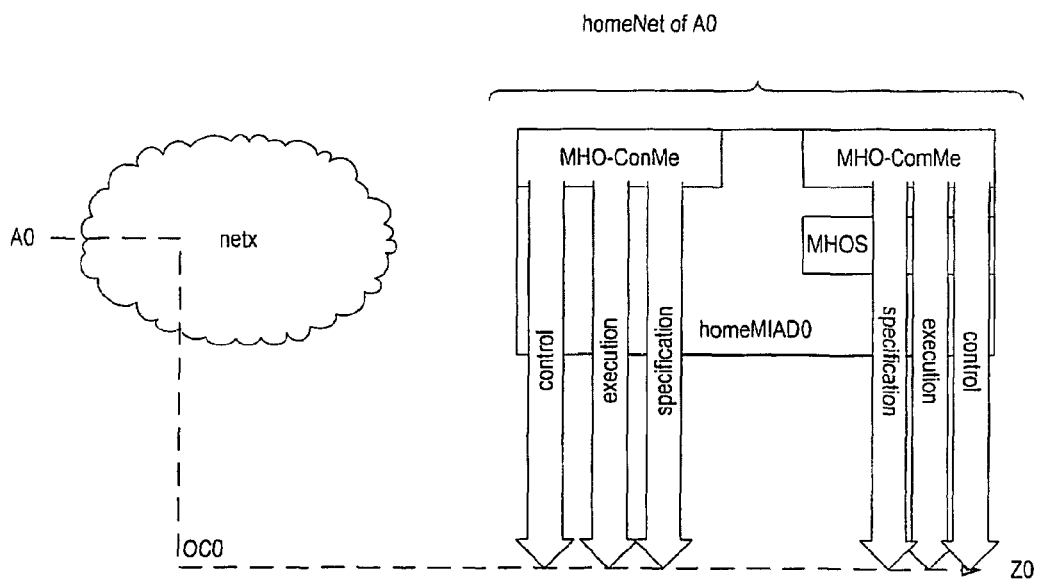
Figure 8E:
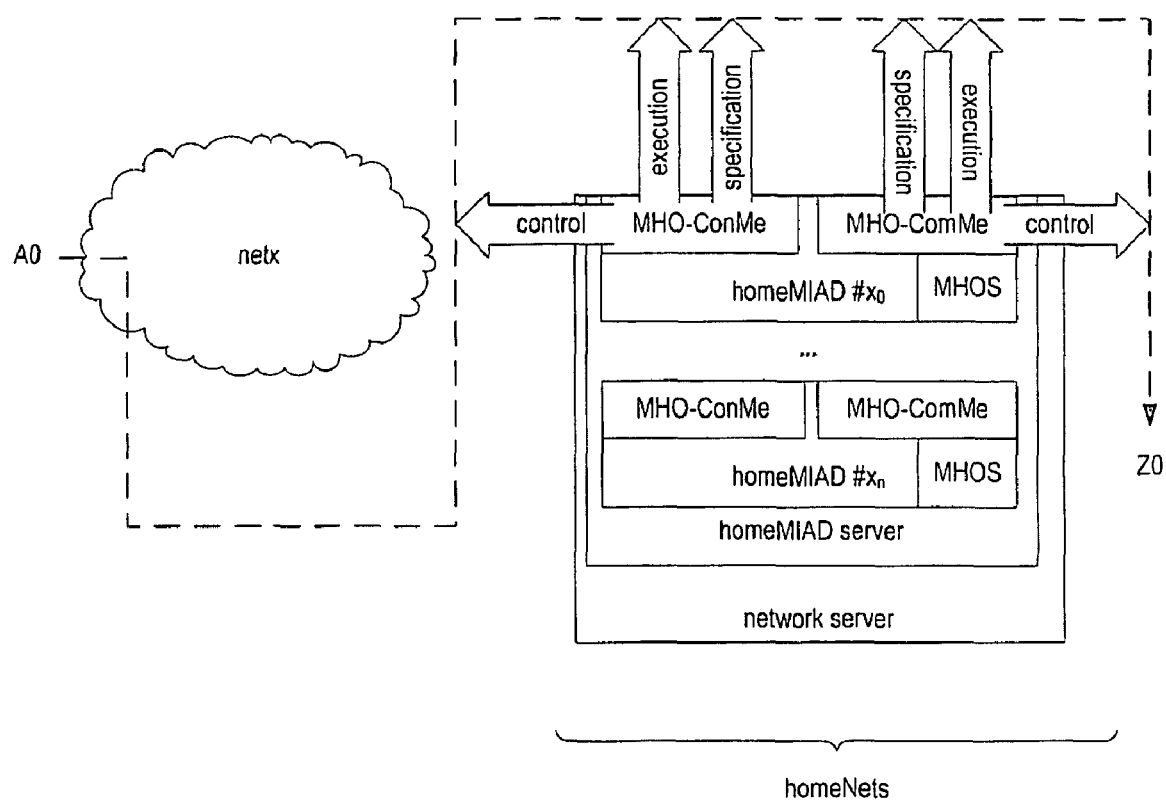

Of close economic interest, as already mentioned, is the complete integration, with regard to the method according to the invention, of a homeMIAD into a network—whether a telecommunications network or a large WLAN—or for example into a network server, because thus a "functional upgrading" of numerous already installed non-Wsurfing-capable IADs with the netsurfing functionality can be simply obtained (=complete "virtual homeMIAD server"). FIG. 6*e* shows this telecommunications arrangement with a large WLAN and a single virtual homeMIAD server. In order to obtain the desired "homeMIAD privacy" in this case—i.e. in order to ensure that the network or server operator/manager hosting the virtual homeMIAD server gains no access to the hosted virtual homeMIADs—the communication of an operator/manager of such a virtual homeMIAD must remain incomprehensible for the network/server operator/manager in the same way as the—on the basis of this communication—MHOS stored in such a virtual homeMIAD therefor. The relevant person skilled in the art knows how this can be effected both in an abstract and a material distributed or centralised implementation of a netsurfing method/apparatus, i.e. its homeMIAD, its MHOS, their MHOM and the executing function modules.

FIG. 6 thus show possible separations—i.e. possible distributed implementations—only of the ComMe functionalities required for MHOs—from other MHO-Me functionalities. FIGS. 7*a-e* outline for each of them a possible separation—i.e. possible distributed implementation—of their homeMIAD0 control function from an associated executing functional module in another system, thus all still not distributing the implementation of the MHOS. FIGS. 8*a-e* therefore outline for each of the MHO-Me functionalities a possible separation of their homeMIAD0 control functions from at least one part of the MHOS controlling them, by their distribution to two systems. In this sense at least one part of an MHOS can itself be regarded as executable, it is in any case interpretable.

Such suitable distributed—ultimately material—implementations make it easier for operators of large networks or internet servers, on the basis of the method according to the invention, to offer the most different innovative multi media telecommunications services in all possible cooperations, e.g. with shared WLAN operators and/or IP-TV program providers.

According to this it is particularly clear that the "comprise" in the claims wordings must not be restricted to "now contains/covers"—but for such a "comprise" also the other reasonable interpretation possibilities of natural language apply in this connection, e.g. "is in connection with " and/or "has to be observed/followed" and this also includes the future.

What is claimed is:

1. A method for executing a managed handover of a wireless terminal device, which is assigned to at least one home Internet access device (homeIAD) being hosted by at least one system, from a first wireless network to a second wireless network provided by a shared Internet access device (IADx), wherein said terminal device comprises an endpoint of at least one OSI connection that has been established over the first wireless network and the Internet and which remains in existence during the managed handover, comprising:
   (a) establishing a data link connection between said terminal device and said IADx for data exchange therebetween,
   (b) limiting the data exchange over said data link connection between said terminal device and said IADx related to said managed handover to data for
      establishing over said data link connection said OSI connection to the extent not already established and for using it,
   whereby at least one of the data link connection establishment and the data exchange is subject to approval by said homeIAD.

2. A method according to claim 1, wherein said homeIAD hosting systems are separate from said IADx.

3. A method according to claim 1, wherein said homeIAD hosting systems comprise said IADx.

4. A method according to claim 1, wherein the managed handover so preserves several such OSI connections.

5. A method according to claim 1, wherein a relay in an OSI connection used by a managed handover may be located in one of its endpoints or in the homeIAD of a terminal device hosting said endpoint.

6. A method according to claim 1, wherein said relay is tunnel-free for at least one OSI connection.

7. A method according to claim 1, further comprising:
   providing convenience information about the potential or actual or completed execution of the steps (a) or (b) to a user of at least one terminal device of said OSI connection, and
   providing to one of said terminal devices a commercial communication relating to a commercial measure,
   whereby the commercial communication is provided in correlation with the provision of the convenience information.

8. A method according to claim 7, wherein at least one communication of said convenience information or said commercial communication uses the same relay as said OSI connection.

9. A method according to claim 8, whereby within said same relay said communication is multiplexed onto said OSI connection's part between said relay and at least one said terminal device.

10. A method according to claim 7, wherein for one of said terminal devices none of said communications overlaps in time with another communication.

11. A method for executing a managed handover of a wireless terminal device assigned to a home Internet access device (homeIAD), from a first wireless network to a second wireless network, wherein said wireless terminal device comprises an endpoint of an OSI connection that has been established over the first wireless network and the Internet and which remains in existence during the managed handover, comprising:
   (a) detecting a request for a network connection for said existing OSI connection to be routed over the second network and the Internet,
   (b) receiving authorization for said request from said homeIAD;
   (c) in response to receiving said authorization, establishing said network connection over said second network to the extent not already established, and
   (d) routing said existing OSI connection over said established network connection over said second network.

12. A method according to claim 11, wherein said homeIAD hosting systems are separate from said IADx.

13. A method according to claim 11, wherein said homeIAD hosting systems comprise said IADx.

14. A method according to claim 11, wherein the managed handover so preserves several such OSI connections.

15. A method according to claim 11, wherein a relay in an OSI connection used by a managed handover may be located in one of its endpoints or in the homeIAD of a terminal device hosting said endpoint.

16. A method according to claim 11, wherein said relay is tunnel-free for at least one OSI connection.

17. A method according to claim 11, further comprising:
  providing convenience information about the potential or actual or completed execution of the steps (a), (b), (c) or (d) to a user of at least one terminal device of said OSI connection, and
  providing to one of said terminal devices a commercial communication relating to a commercial measure,
  whereby the commercial communication is provided in correlation with the provision of the convenience information.

18. A method according to claim 17, wherein at least one communication of said convenience information or said commercial communication uses the same relay as said OSI connection.

19. A method according to claim 18, whereby within said same relay said communication is multiplexed onto said OSI connection's part between said relay and at least one said terminal device.

20. A method according to claim 17, wherein for one of said terminal devices none of said communications overlaps in time with another communication.

21. Apparatus for executing a managed handover of a wireless terminal device, which is assigned to at least one home Internet access device (homeIAD) being hosted by at least one system, from a first wireless network to a second wireless network provided by a shared Internet access device (IADx), wherein said terminal device comprises an endpoint of at least one OSI connection that has been established over the first wireless network and the Internet and which remains in existence during the managed handover, comprising:
  means for establishing a data link connection between said terminal device and said IADx for data exchange therebetween,
  means for limiting the data exchange over said data link connection between said terminal device and said IADx related to said managed handover to data for
    establishing over said data link connection said OSI connection to the extent not already established and for using it,
  whereby at least one of the data link connection establishment and the data exchange is subject to approval by said homeIAD.

22. Apparatus according to claim 21, wherein said homeIAD hosting systems are separate from said IADx.

23. Apparatus according to claim 21, wherein said homeIAD hosting systems comprise said IADx.

24. Apparatus according to claim 21, wherein the managed handover so preserves several such OSI connections.

25. Apparatus according to claim 21, wherein a relay in an OSI connection used by a managed handover may be located in one of its endpoints or in the homeIAD of a terminal device hosting said endpoint.

26. Apparatus according to claim 21, wherein said relay is tunnel-free for at least one OSI connection.

27. Apparatus according to claim 21, further comprising:
  providing convenience information about the potential or actual or completed execution of said data link connection establishment or said data exchange to a user of at least one terminal device of said OSI connection, and
  providing to one of said terminal devices a commercial communication relating to a commercial measure,
  whereby the commercial communication is provided in correlation with the provision of the convenience information.

28. Apparatus according to claim 27, wherein at least one communication of said convenience information or said commercial communication uses the same relay as said OSI connection.

29. Apparatus according to claim 28, whereby within said same relay said communication is multiplexed onto said OSI connection's part between said relay and at least one said terminal device.

30. Apparatus according to claim 27, wherein for one of said terminal devices none of said communications overlaps in time with another communication.

31. Apparatus for executing a managed handover of a wireless terminal device assigned to a home Internet access device (homeIAD), from a first wireless network to a second wireless network, wherein said wireless terminal device comprises an endpoint of an OSI connection that has been established over the first wireless network and the Internet and which remains in existence during the managed handover, comprising:
  means for detecting a request for a network connection for said existing OSI connection to be routed over the second network and the Internet,
  means for receiving authorization for said request from said homeIAD;
  means for, in response to receiving said authorization, establishing said network connection over said second network to the extent not already established, and
  means for routing said existing OSI connection over said established network connection over said second network.

32. Apparatus according to claim 31, wherein said homeIAD hosting systems are separate from said IADx.

33. Apparatus according to claim 31, wherein said homeIAD hosting systems comprise said IADx.

34. Apparatus according to claim 31, wherein the managed handover so preserves several such OSI connections.

35. Apparatus according to claim 31, wherein a relay in an OSI connection used by a managed handover may be located in one of its endpoints or in the homeIAD of a terminal device hosting said endpoint.

36. Apparatus according to claim 31, wherein said relay is tunnel-free for at least one OSI connection.

37. Apparatus according to claim 31, further comprising:
  means for providing convenience information about the potential or actual or completed execution of the request detection, receiving authorization, establishing said network connection, or routing said existing OSI connection, to a user of at least one terminal device of said OSI connection, and
  providing to one of said terminal devices a commercial communication relating to a commercial measure,
  whereby the commercial communication is provided in correlation with the provision of the convenience information.

38. Apparatus according to claim 37, wherein at least one communication of said convenience information or said commercial communication uses the same relay as said OSI connection.

39. Apparatus according to claim 38, whereby within said same relay said communication is multiplexed onto said OSI connection's part between said relay and at least one said terminal device.

40. Apparatus according to claim 37, wherein for one of said terminal devices none of said communications overlaps in time with another communication.

* * * * *